(12) United States Patent
Pfeiffer et al.

(10) Patent No.: US 11,833,654 B2
(45) Date of Patent: *Dec. 5, 2023

(54) MULTI-TOOL SYSTEM

(71) Applicant: WOLF TOOTH COMPONENTS, LLC, Burnsville, MN (US)

(72) Inventors: Michael W. Pfeiffer, Eden Prairie, MN (US); Anthony C. Bacon, Minneapolis, MN (US); Jonathan E. Rosemeier, Prior Lake, MN (US); Jack W. Hinkens, Eden Prairie, MN (US)

(73) Assignee: Wolf Tooth Components, LLC, Burnsville, MN (US)

( * ) Notice: Subject to any disclaimer, the term of this patent is extended or adjusted under 35 U.S.C. 154(b) by 356 days.

This patent is subject to a terminal disclaimer.

(21) Appl. No.: 17/135,950

(22) Filed: Dec. 28, 2020

(65) Prior Publication Data

US 2021/0197353 A1 Jul. 1, 2021

Related U.S. Application Data

(60) Provisional application No. 62/953,892, filed on Dec. 26, 2019.

(51) Int. Cl.
| | |
|---|---|
| *B25F 1/02* | (2006.01) |
| *B25F 5/02* | (2006.01) |
| *B62K 21/12* | (2006.01) |
| *B62J 11/22* | (2020.01) |
| *B25G 1/08* | (2006.01) |

(Continued)

(52) U.S. Cl.
CPC ............... *B25F 1/02* (2013.01); *B21L 21/00* (2013.01); *B25B 27/0071* (2013.01); *B25F 5/029* (2013.01); *B25G 1/085* (2013.01); *B29C 73/08* (2013.01); *B62J 9/21* (2020.02); *B62J 9/40* (2020.02); *B62J 11/22* (2020.02); *B62K 21/12* (2013.01); *B62K 21/26* (2013.01); *B25B 15/00* (2013.01)

(58) Field of Classification Search
CPC ........ B25F 1/02; B25F 5/029; B25B 27/0071; B25G 1/085; B62K 21/12; B62K 21/26; B62J 9/40; B62J 9/21; B62J 11/22; B21L 21/00; B29C 73/08
USPC ............................................................ 7/167
See application file for complete search history.

(56) References Cited

U.S. PATENT DOCUMENTS

| | | |
|---|---|---|
| 3,667,518 A | 6/1972 | Stillwagon, Jr. |
| D230,131 S | 1/1974 | Levinson |

(Continued)

OTHER PUBLICATIONS

"Domain Cycling Aluminum Bike Handlebar Bar" Domain Cycling Store., posted date Aug. 10, 2018 [online], [retrieved on Jan. 13, 2021]. Retrieved from the Internet <URL: https://www.amazon.com/Domain-Cycling-Handlebar-Expanding-Adjustable/dp/B07GC4TZGSI> (Year: 2018).

(Continued)

*Primary Examiner* — Don M Anderson
*Assistant Examiner* — Jason Khalil Hawkins
(74) *Attorney, Agent, or Firm* — Dicke, Billig & Czaja, PLLC

(57) ABSTRACT

A multi-tool system includes a multi-tool sleeve assembly including a storage sleeve and an end cap to be inserted into an open end of the storage sleeve, with one of a bit driver multi-tool or a chain break multi-tool to be stored in the storage sleeve of the multi-tool sleeve assembly.

12 Claims, 65 Drawing Sheets

(51) Int. Cl.
| | |
|---|---|
| *B21L 21/00* | (2006.01) |
| *B25B 27/00* | (2006.01) |
| *B29C 73/08* | (2006.01) |
| *B62J 9/40* | (2020.01) |
| *B62J 9/21* | (2020.01) |
| *B62K 21/26* | (2006.01) |
| *B25B 15/00* | (2006.01) |

(56) References Cited

U.S. PATENT DOCUMENTS

| | | | |
|---|---|---|---|
| 3,852,839 A * | 12/1974 | Blessing | B60C 25/18 |
| | | | 73/146.8 |
| D275,446 S | 9/1984 | McSwain | |
| D277,640 S | 2/1985 | Drexler | |
| D304,898 S | 12/1989 | Brawner et al. | |
| D311,124 S | 10/1990 | Learney | |
| D340,172 S | 10/1993 | Her | |
| D366,015 S | 1/1996 | McCormack | |
| D376,084 S | 12/1996 | Karvinen | |
| 5,615,587 A | 4/1997 | Foerster, Jr. | |
| D396,618 S | 8/1998 | Swinden et al. | |
| D415,944 S | 11/1999 | Chung | |
| D431,439 S | 10/2000 | Morris | |
| D434,632 S | 12/2000 | Tseng | |
| D435,002 S | 12/2000 | Giard | |
| D446,005 S | 8/2001 | Be Lue | |
| D449,260 S | 10/2001 | Shirey | |
| D457,474 S | 5/2002 | Shirey | |
| 6,435,065 B2 | 8/2002 | Kozak et al. | |
| D476,215 S | 6/2003 | Chuang | |
| D490,669 S | 6/2004 | Komar | |
| D496,892 S | 10/2004 | Shirey | |
| 6,916,106 B2 | 7/2005 | Xingguo | |
| D518,350 S | 4/2006 | Hay | |
| D518,351 S | 4/2006 | Hay | |
| D527,896 S | 9/2006 | Fenner | |
| D549,542 S | 8/2007 | Chiang | |
| D555,455 S | 11/2007 | Cheng | |
| D601,799 S | 10/2009 | Andre et al. | |
| 7,669,860 B2 | 3/2010 | Chiang | |
| 8,141,455 B2 | 3/2012 | Ogburn | |
| D659,730 S | 5/2012 | Cantlon | |
| D673,193 S | 12/2012 | Dickrede | |
| D674,265 S | 1/2013 | Greer | |
| D679,811 S | 4/2013 | Hahn | |
| D694,406 S | 11/2013 | Hahn | |
| 8,869,657 B2 | 10/2014 | Matar | |
| D727,123 S | 4/2015 | Oas | |
| D727,424 S | 4/2015 | Skinn | |
| D732,369 S | 6/2015 | Rubin et al. | |
| 9,089,955 B2 | 7/2015 | Johnson | |
| D741,681 S | 10/2015 | Kirby et al. | |
| D755,603 S | 5/2016 | Reedy et al. | |
| D758,262 S | 6/2016 | Rigolio | |
| 9,463,559 B1 | 10/2016 | Chan | |
| 9,469,367 B2 | 10/2016 | Chen | |
| 9,649,443 B2 | 5/2017 | Klintenstedt | |
| 9,656,716 B2 | 5/2017 | DeGray | |
| D798,121 S | 9/2017 | Cheng et al. | |
| D799,204 S | 10/2017 | Constantine | |
| D803,020 S | 11/2017 | Cheng et al. | |
| D804,274 S | 12/2017 | Tsai | |
| D827,973 S | 9/2018 | Stoner | |
| D828,740 S | 9/2018 | Levand et al. | |
| D840,208 S | 2/2019 | Scott | |
| D855,972 S | 8/2019 | Scully | |
| D864,693 S | 10/2019 | Levand et al. | |
| D866,286 S | 11/2019 | Parks | |
| 10,500,648 B1 | 12/2019 | Saffouri | |
| D886,564 S | 6/2020 | Dittmer | |
| D886,565 S | 6/2020 | Hinkens | |
| D887,232 S | 6/2020 | Holloway | |
| D897,171 S | 9/2020 | Hodson et al. | |
| D899,217 S | 10/2020 | Bould et al. | |
| D900,568 S | 11/2020 | Zimmer | |
| D904,852 S | 12/2020 | Levand et al. | |
| D911,794 S | 3/2021 | Tarnay | |
| D912,485 S | 3/2021 | Wang | |
| D915,861 S | 4/2021 | Zhong | |
| D918,003 S | 5/2021 | Liu et al. | |
| D919,485 S | 5/2021 | Pfeiffer et al. | |
| D922,166 S | 6/2021 | Sawa | |
| D922,844 S | 6/2021 | Bacon et al. | |
| D927,954 S | 8/2021 | Pfeiffer | |
| D935,295 S | 11/2021 | Bacon et al. | |
| D940,526 S | 1/2022 | Pfeiffer et al. | |
| 2003/0140744 A1 | 7/2003 | Chen | |
| 2003/0188434 A1 * | 10/2003 | Chiu | B25B 15/02 |
| | | | 30/329 |
| 2003/0213354 A1 | 11/2003 | Frers | |
| 2004/0093745 A1 * | 5/2004 | Liao | B23D 51/10 |
| | | | 30/329 |
| 2005/0078480 A1 | 4/2005 | Xingguo | |
| 2005/0218285 A1 | 10/2005 | Yorns | |
| 2011/0041657 A1 | 2/2011 | Hung | |
| 2011/0158755 A1 | 6/2011 | Churlet | |
| 2012/0222265 A1 | 9/2012 | Chen | |
| 2012/0237305 A1 | 9/2012 | Lee | |
| 2013/0213191 A1 | 8/2013 | Harvey et al. | |
| 2015/0102567 A1 | 4/2015 | Chan | |
| 2015/0122090 A1 | 5/2015 | Ott | |
| 2016/0136804 A1 | 5/2016 | Chang | |
| 2018/0022418 A1 | 1/2018 | Pfeiffer | |
| 2019/0275651 A1 | 9/2019 | Dittmer | |
| 2020/0009929 A1 | 1/2020 | Bendorf | |
| 2021/0101266 A1 | 4/2021 | Gu | |
| 2021/0146641 A1 | 5/2021 | Chuang | |
| 2021/0170814 A1 | 6/2021 | Chuang | |
| 2021/0187713 A1 | 6/2021 | Winefordner et al. | |
| 2021/0197348 A1 | 7/2021 | Bacon et al. | |
| 2021/0197354 A1 | 7/2021 | Pfeiffer et al. | |
| 2021/0197920 A1 | 7/2021 | Bacon et al. | |

OTHER PUBLICATIONS

"Condor Bar End Plug" Condor., posted date Sep. 28, 2015 [online], [retrieved on Jan. 13, 2021]. Retrieved from the Internet <URL: https://www.condorcycles.com/products/condor-bar-end-plug> (Year: 2015).

"Origin8 Rubber Bar End Plugs, Black" Modern Bike., posted date Aug. 9, 2019 [online], [retrieved on Jan. 13, 2021]. Retrieved from the Internet <URL: https://www.modernbike.com/origin8-rubber-bar-end-plugs-black> (Year: 2019).

All In Multitool, retrieved Feb. 28, 2020, 4 pages, <https://www.allinmultitool.co.uk/products/all-in-multitool>.

All In Multitool V2—Black—With Chain Tool, retrieved Feb. 28, 2020, 4 pages, <https://www.allinmultitool.co.uk/products/all-in-multitool-v2-black>.

Barintool, retrieved Feb. 28, 2020, 11 pages, <https://www.barintool.com/product-page/small-package?lang=en>.

Mineral Design—Barstow System, retrieved Feb. 28, 2020, 7 pages, <http://www.mineralbikes.com/shop/barstow-system>.

Bikepacking.com, Bit Driver Multi-Tools for Bikepacking and Bike Touring, The Low Down Gear Guide, retrieved Feb. 28, 2020, 13 pages, <https://bikepacking.com/gear/bit-driver-multi-tools/>.

Lezyne—T-Drive Bike Multi Tool Kit, retrieved Feb. 28, 2020, 8 pages, <https://ride.lezyne.com/collections/multi-tools/products/t-drive>.

Road.cc, 12 of the Best Multi Tools—Get the Right Bits to Fix your Bike's Bits, retrieved Feb. 28, 2020, 9 pages, <https://road.cc/content/buyers-guide/215058-12-best-multi-tools-get-right-bits-fix-your-bikes-bits>.

Granite Design—Stash Chain Tool, retrieved Feb. 28, 2020, 4 pages, <https://www.granite-design.com/stashchaintool>.

Granite Design—Stash Multi-Tool, retrieved Feb. 28, 2020, 4 pages, <https://www.granite-design.com/stashmultitool>.

Granite Design—Stash Tire Plug Kit, retrieved Feb. 28, 2020, 4 pages, <https://www.granite-design.com/stashtireplug>.

(56) References Cited

OTHER PUBLICATIONS

Topeak—Ninja C, retrieved Feb. 28, 2020, 5 pages, <https://www.topeak.com/global/en/products/ninja-series/102-ninja-c>.

Review: Sahmurai Sword Bar End Tubeless Plugs Seal Tires Fast & Easy, retrieved Feb. 25, 2021, 9 pgs, <https://bikerumor.com/review-sahmurai-sword-bar-end-tubeless-plugs-seal-tires-fast-easy>.

EnCase System Hex Bit Wrench Multi-Tool, posted on amazon.com, earliest available Nov. 2019, no production date given, [online], retrieved May 6, 2021, 2 pgs, <https://www.amazon.com/Wolf-Tooth-Components-EnCase-Multi-Tool/dp/B081B64JC9/ref=sr_1_2?child=1&keywords=encase+sys> (2019).

\* cited by examiner

MULTI-TOOL SYSTEM

CROSS-REFERENCE TO RELATED APPLICATIONS

This application claims priority under 35 U.S.C. 119(e) to U.S. Provisional Patent Application Ser. No. 62/953,892 filed on Dec. 26, 2019, and incorporated herein by reference. In this instance, the day that is 12 months after the filing date of the provisional application falls on a Saturday (i.e., Saturday, Dec. 26, 2020). As such, the period of pendency of the provisional application is extended to the next succeeding business day (i.e., Monday, Dec. 28, 2020). See 35 U.S.C. 119(e)(3).

BACKGROUND

The present disclosure relates generally to a multi-tool system and, more specifically, relates to a multi-tool system for use with a bicycle.

BRIEF DESCRIPTION OF THE DRAWINGS

Bit Driver Multi-Tool (100)

Chain Break and Tire Plug Multi-Tool (200)

Figure 15:
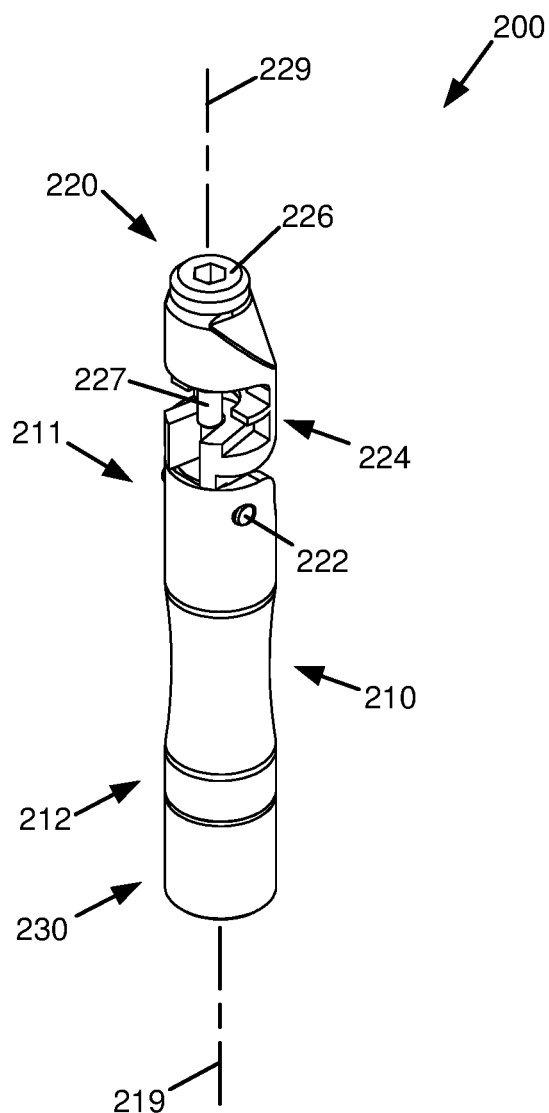
Figure 16:
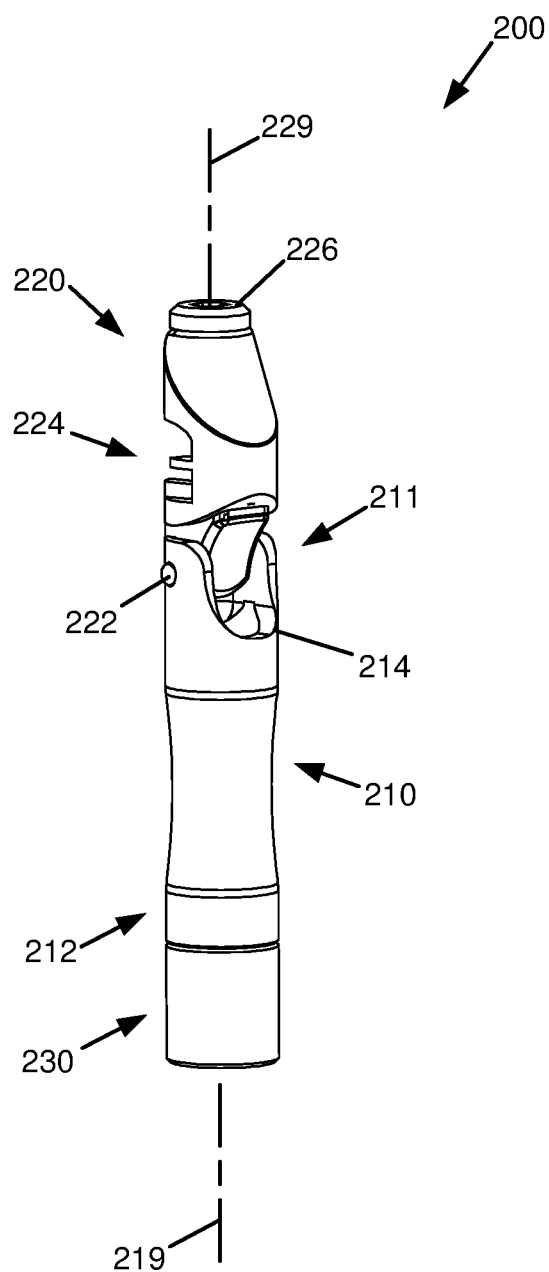
Figure 17:
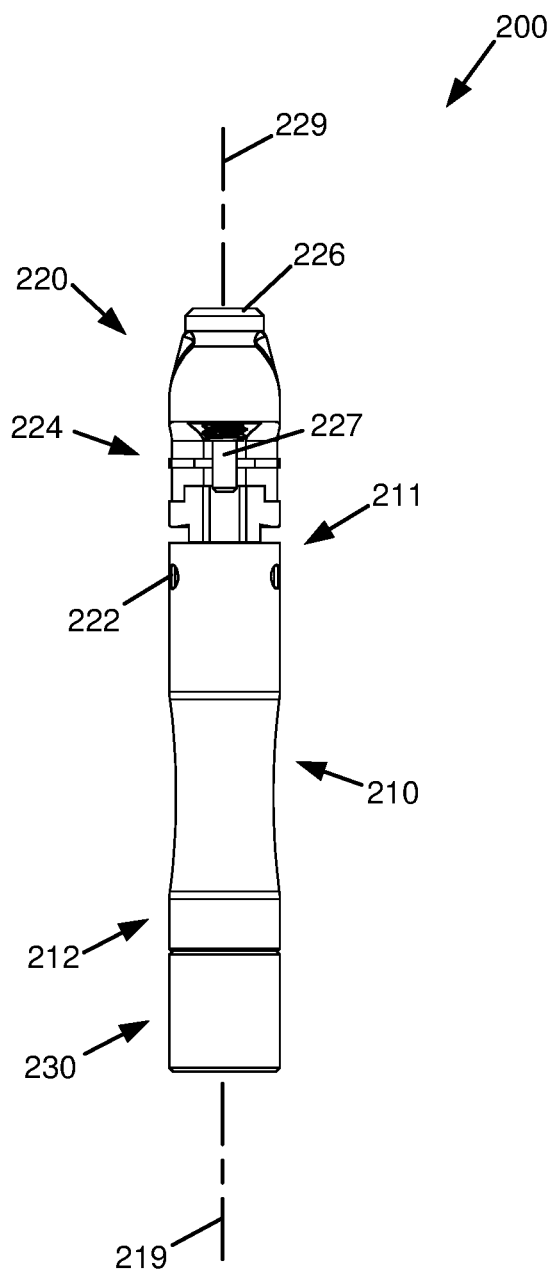
Figure 18:
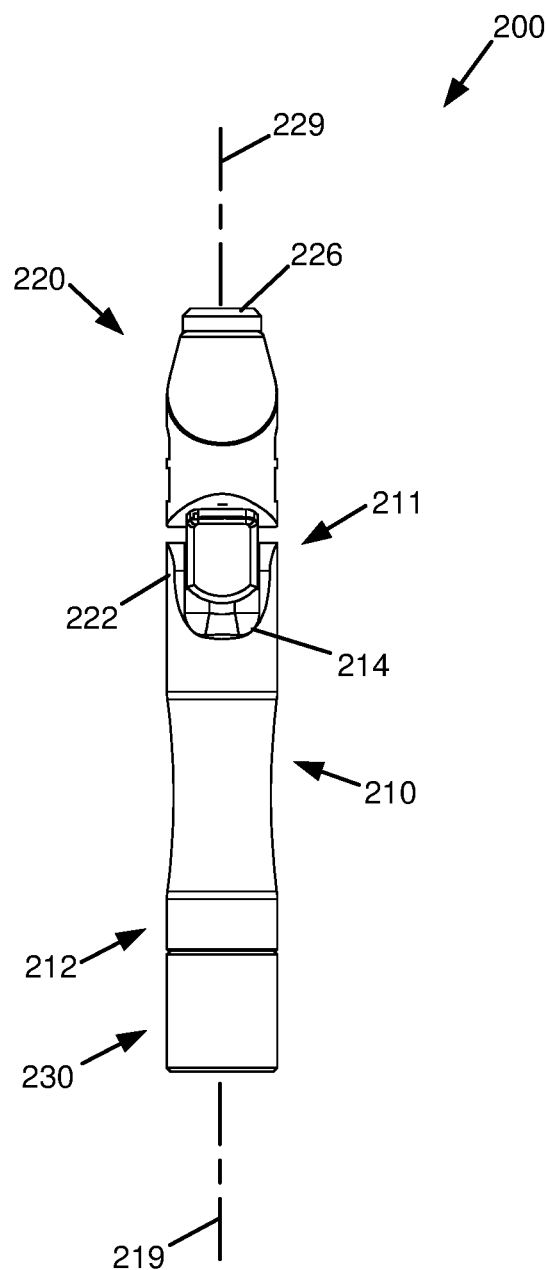
Figure 19:
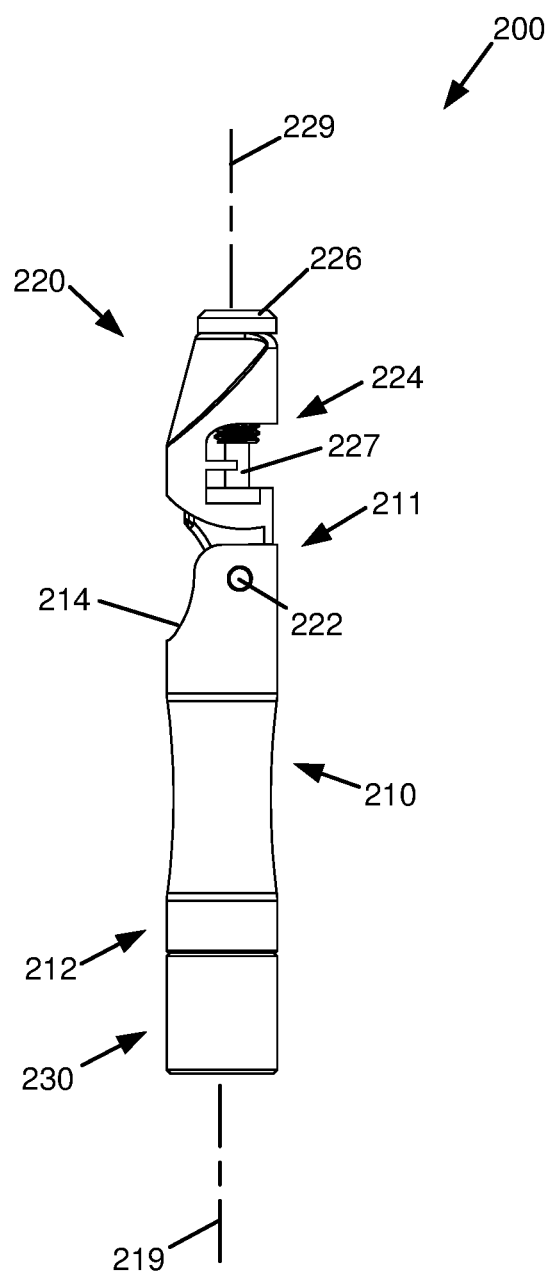
Figure 20:
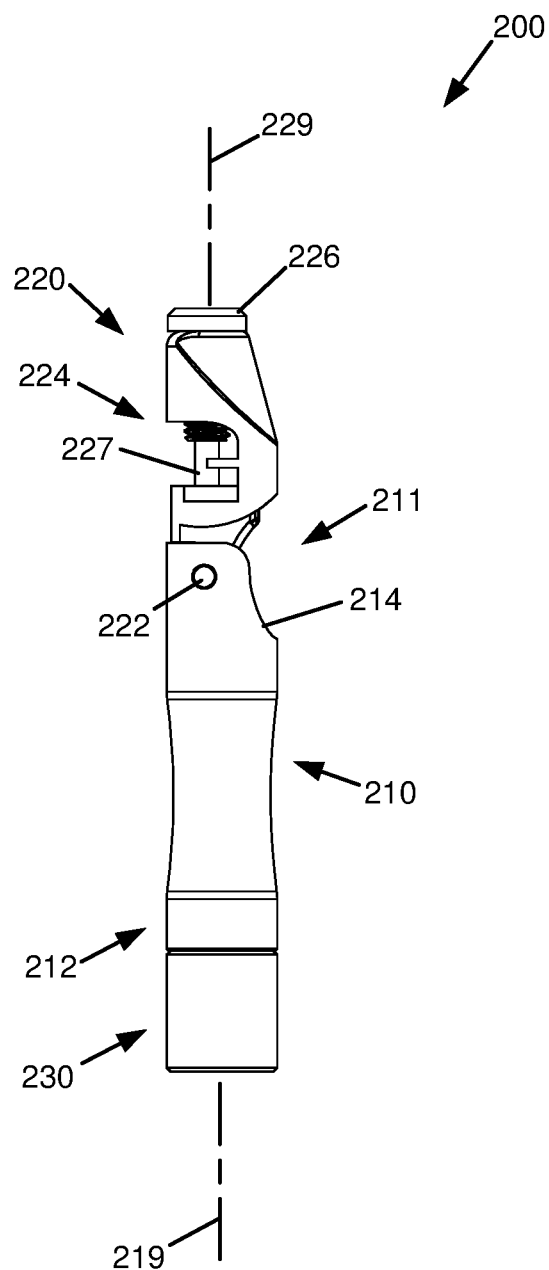

FIGS. 15 and 16 are perspective views of an example of a chain break and tire plug multi-tool, with a head of the chain break and tire plug multi-tool in a first position.

FIGS. 17, 18, 19, and 20 are elevation views of the chain break and tire plug multi-tool of FIG. 15.

Figure 21:
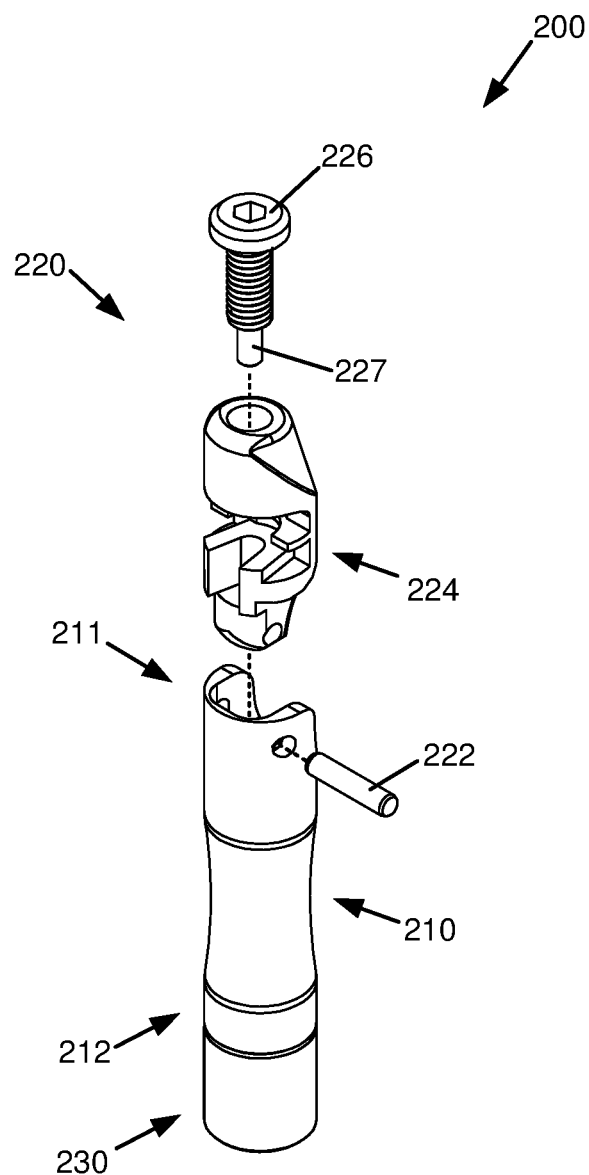

FIG. 21 is an exploded perspective view of the chain break and tire plug multi-tool of FIG. 15.

Figure 22:
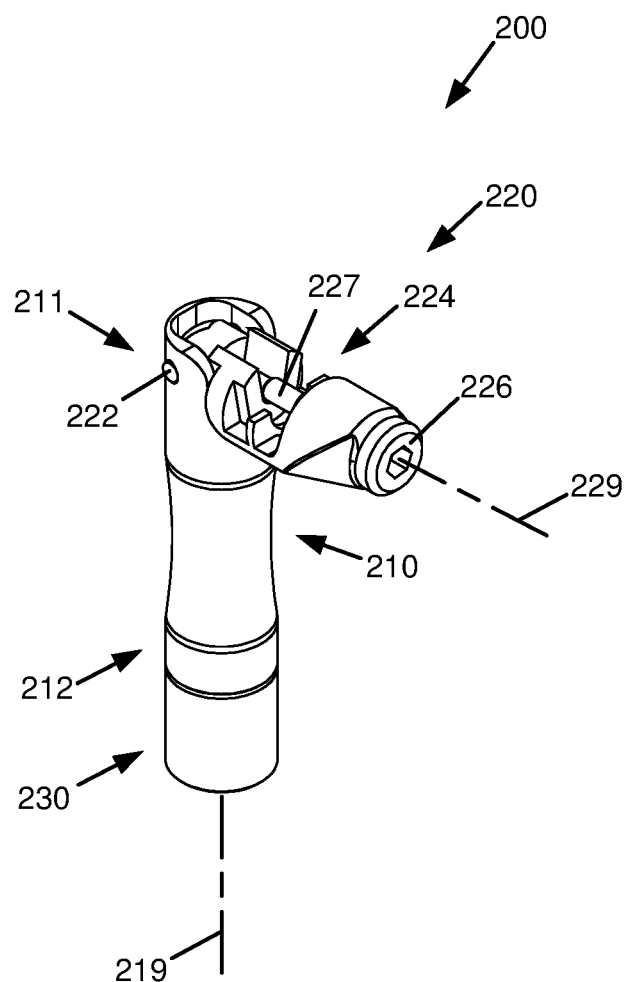

FIG. 22 is a perspective view of the chain break and tire plug multi-tool of FIG. 15, with the head of the chain break and tire plug multi-tool in a second position.

Figure 23:
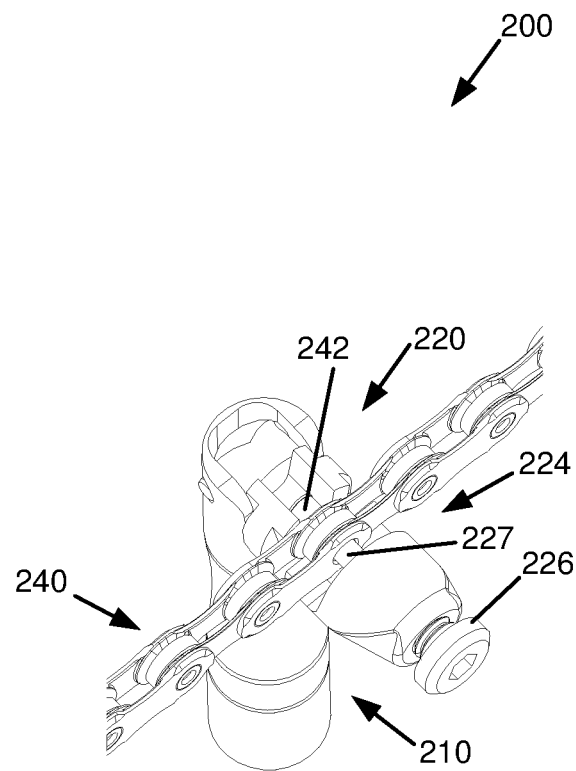

FIG. 23 illustrates an example of use of the chain break and tire plug multi-tool of FIG. 15.

Figure 24A:
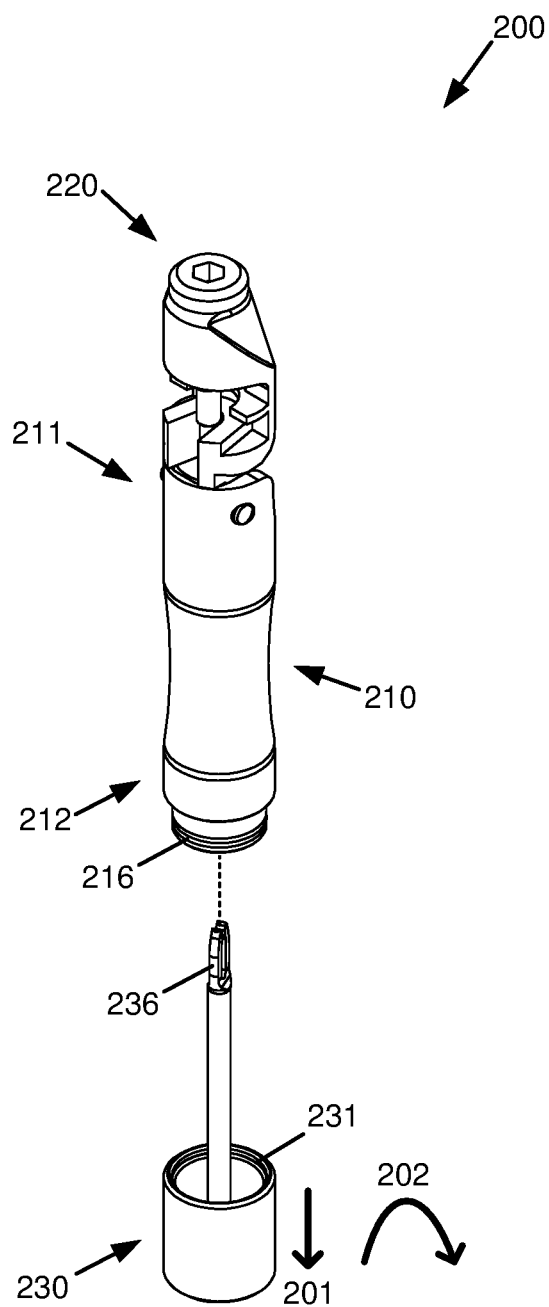
Figure 24B:
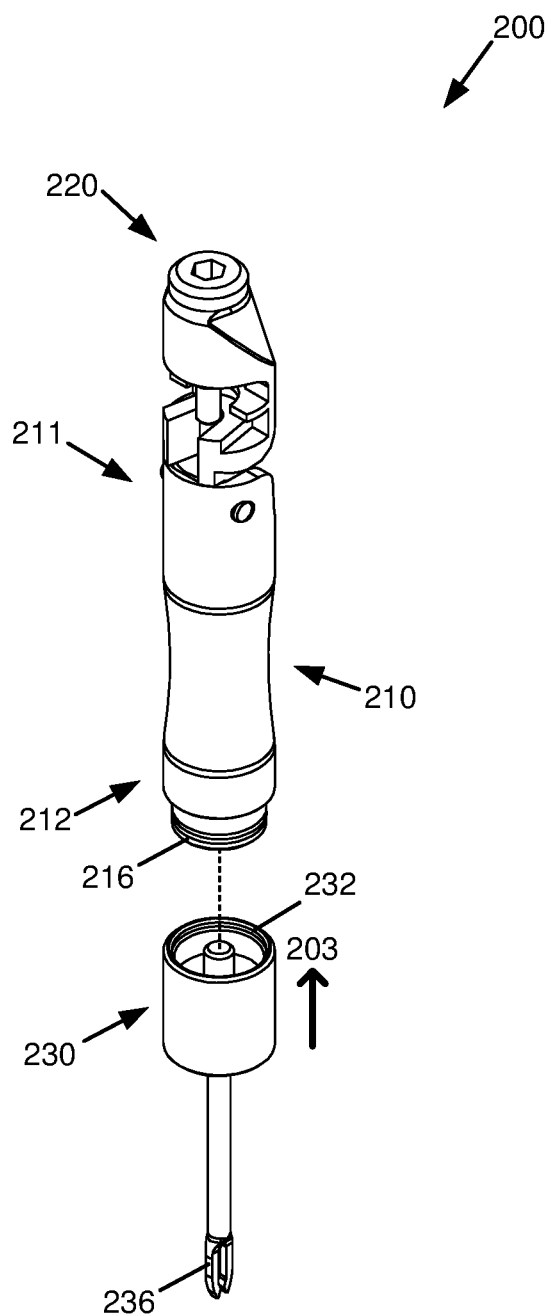

FIGS. 24A and 24B are exploded perspective views of the chain break and tire plug multi-tool of FIG. 15.

Figure 25:
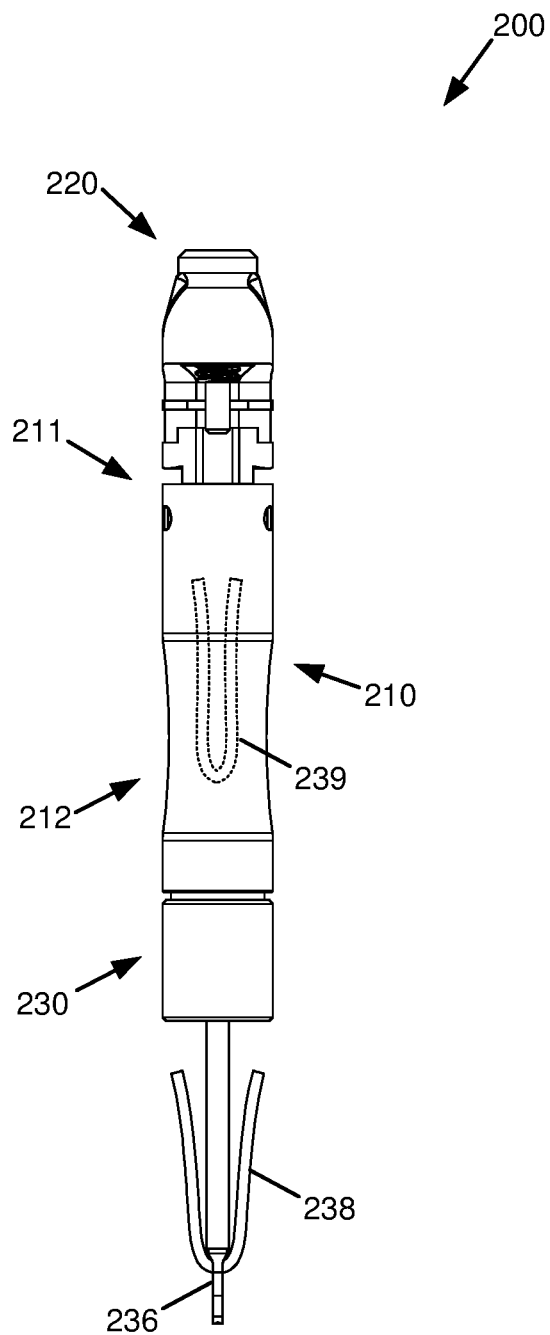

FIG. 25 illustrates an example of use of the chain break and tire plug multi-tool of FIG. 15.

Multi-Tool Storage Sleeve (300)

Figure 26:
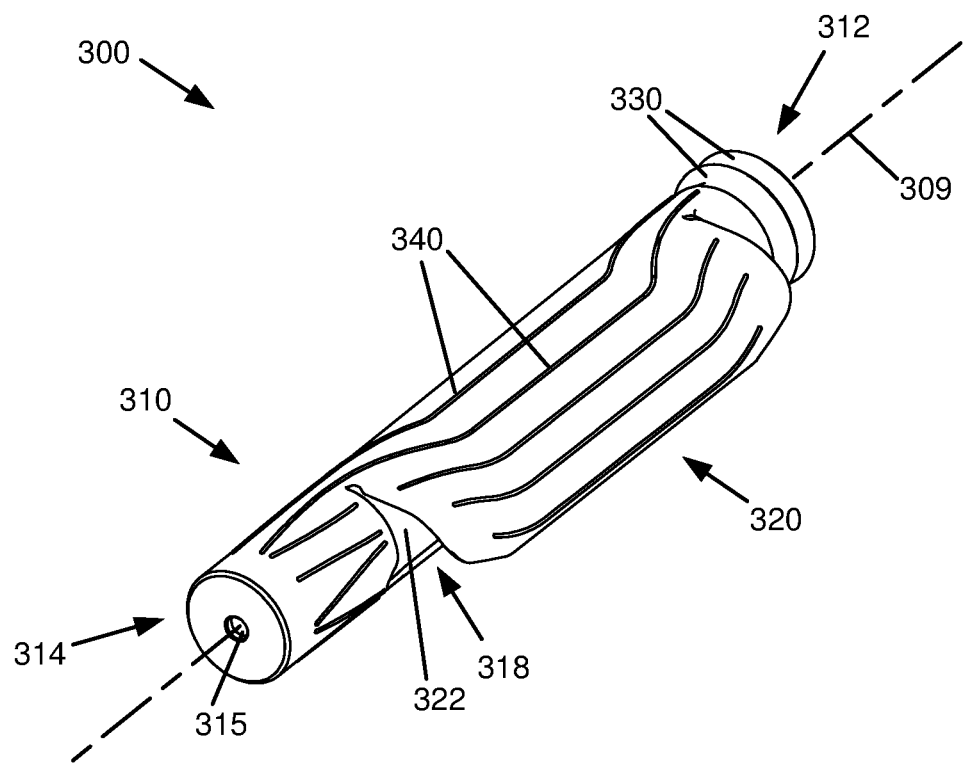
Figure 27:
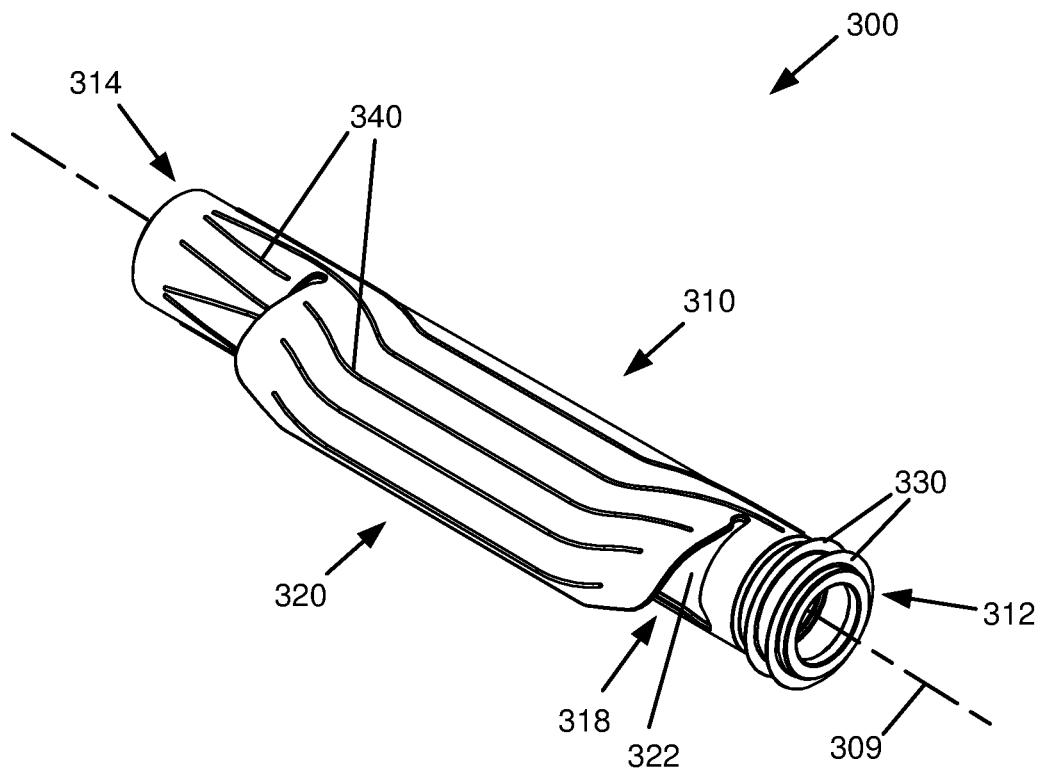
Figure 28:
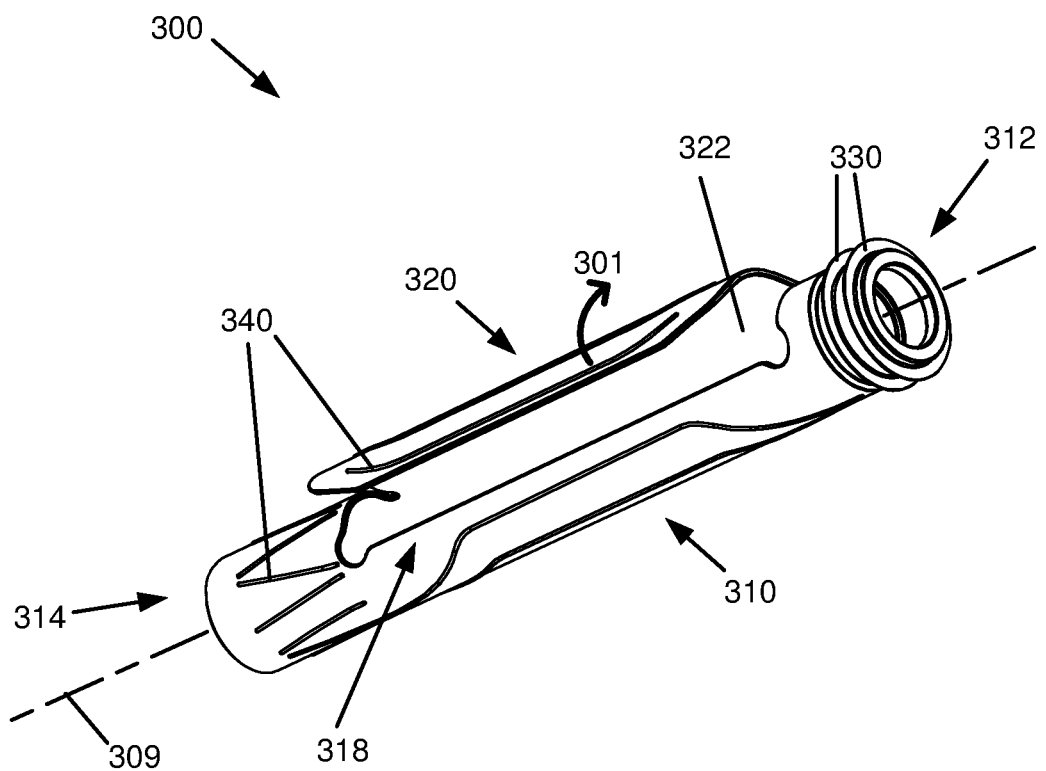

FIGS. 26, 27, and 28 are perspective views of an example of a multi-tool storage sleeve, with a flap of the multi-tool storage sleeve in an open position.

Figure 29:
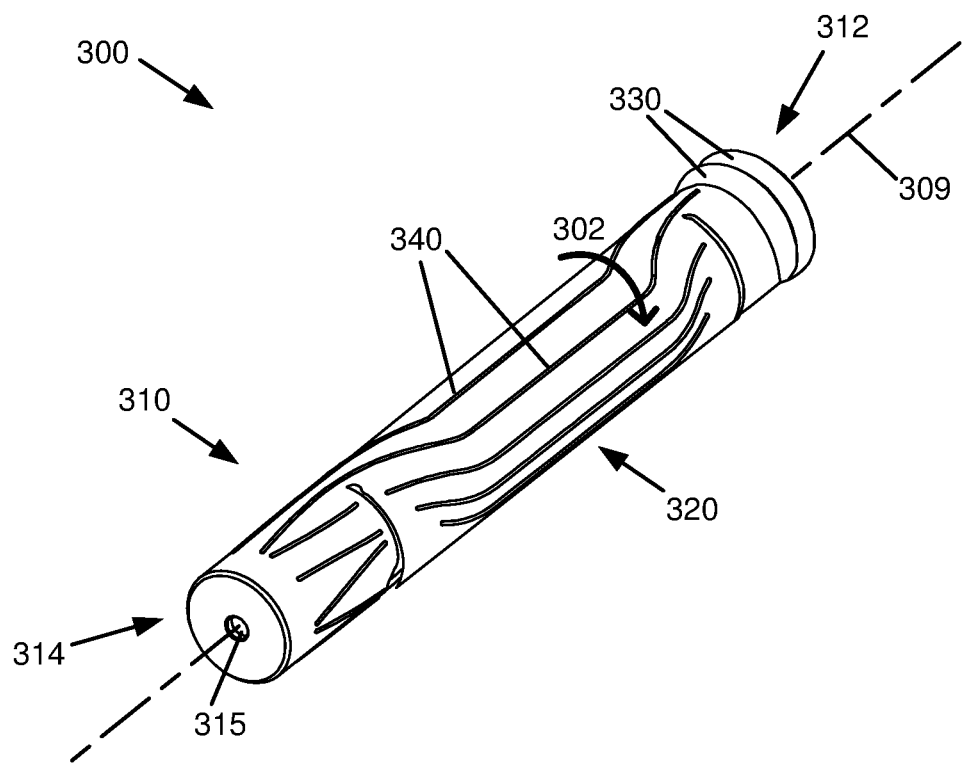

FIG. 29 is a perspective view of the multi-tool storage sleeve of FIG. 26, with the flap of the multi-tool storage sleeve in a closed position.

Figure 30:
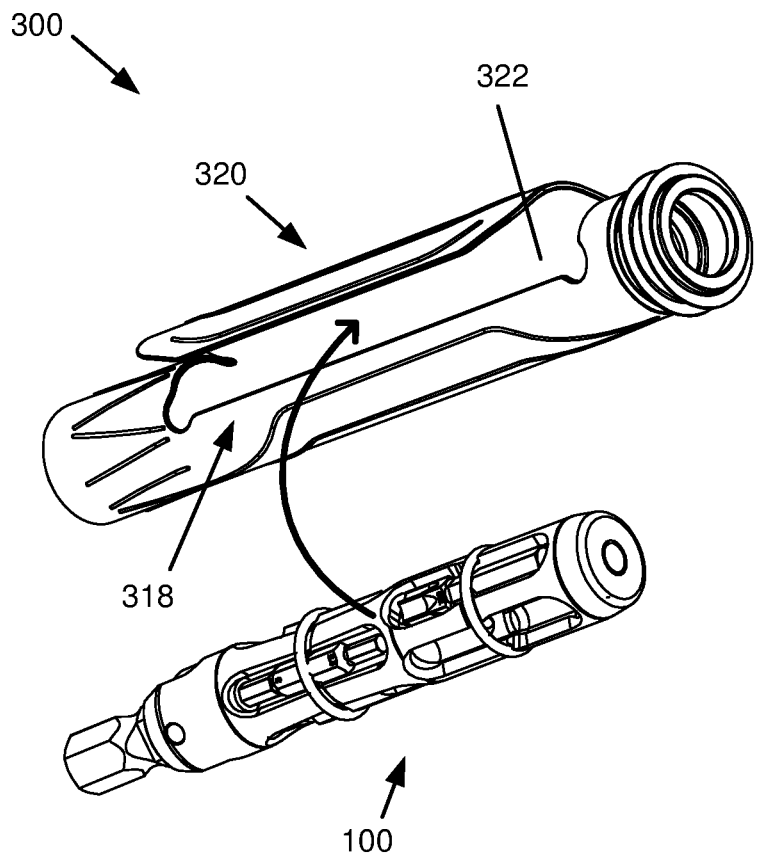
Figure 31:
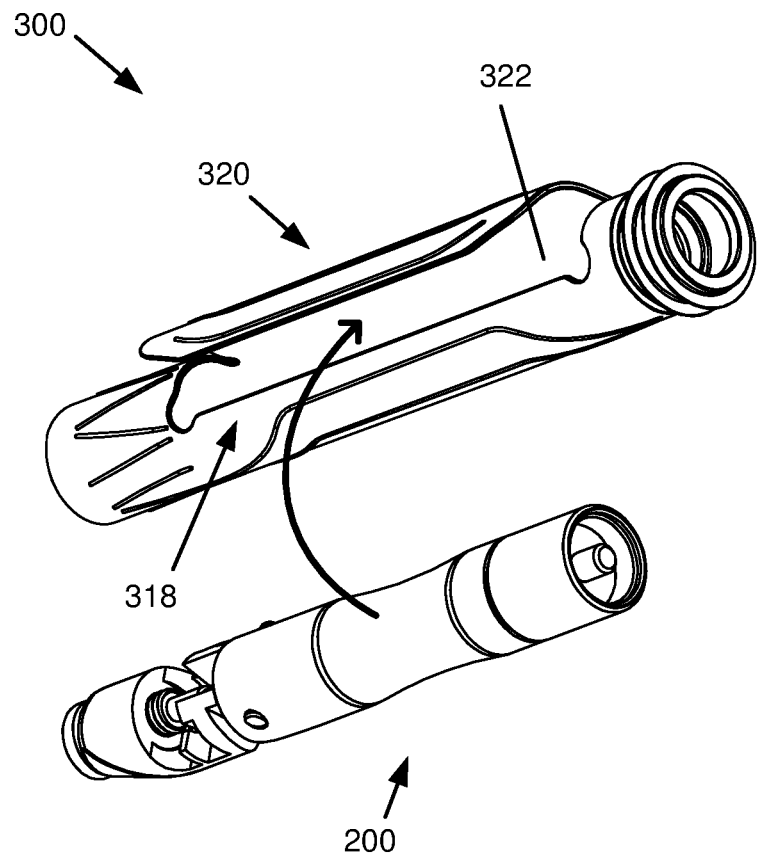

FIGS. 30 and 31 illustrate examples of use of the multi-tool storage sleeve of FIG. 26.

Bar End Cap (400)

Figure 32:
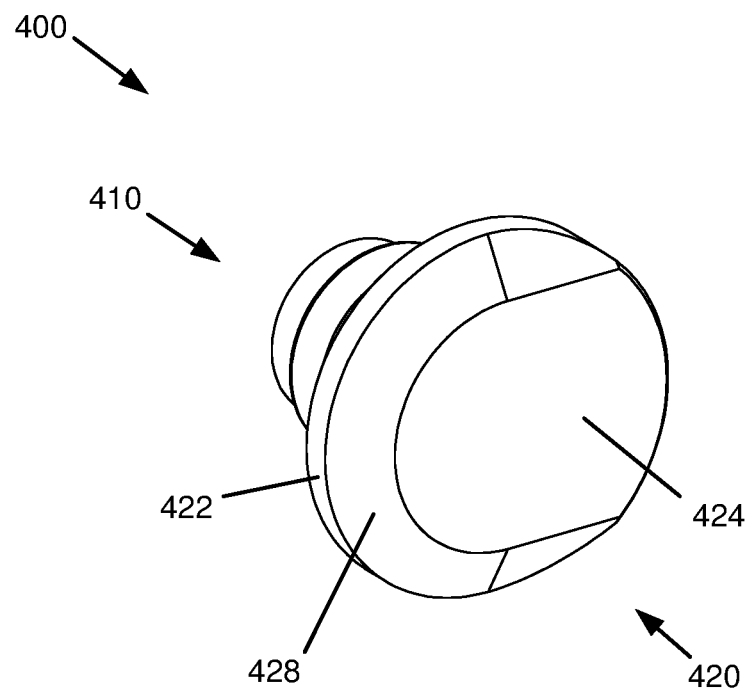
Figure 33:
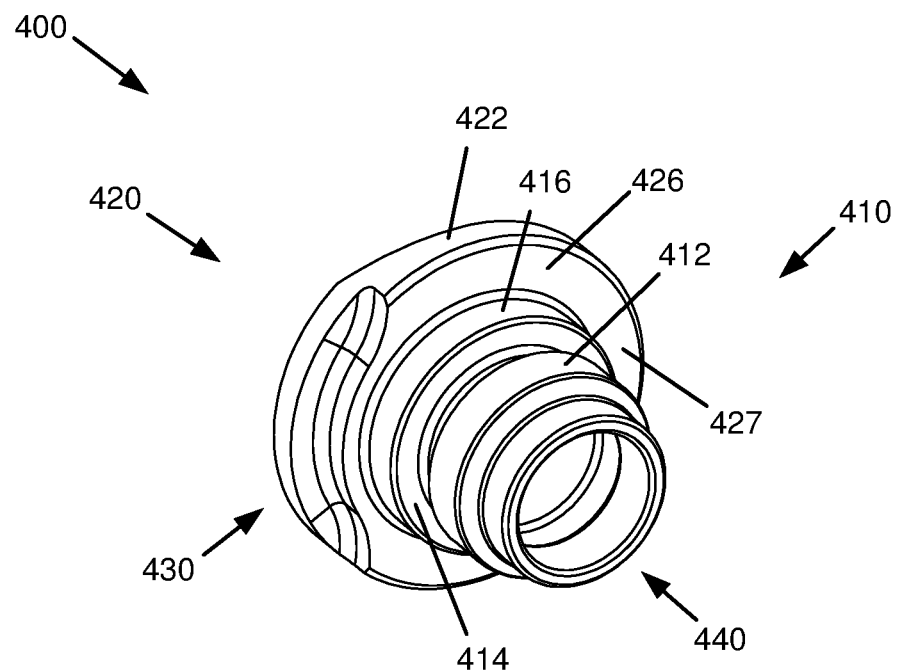

FIGS. 32 and 33 are perspective views of an example of a bar end cap.

Figure 34:
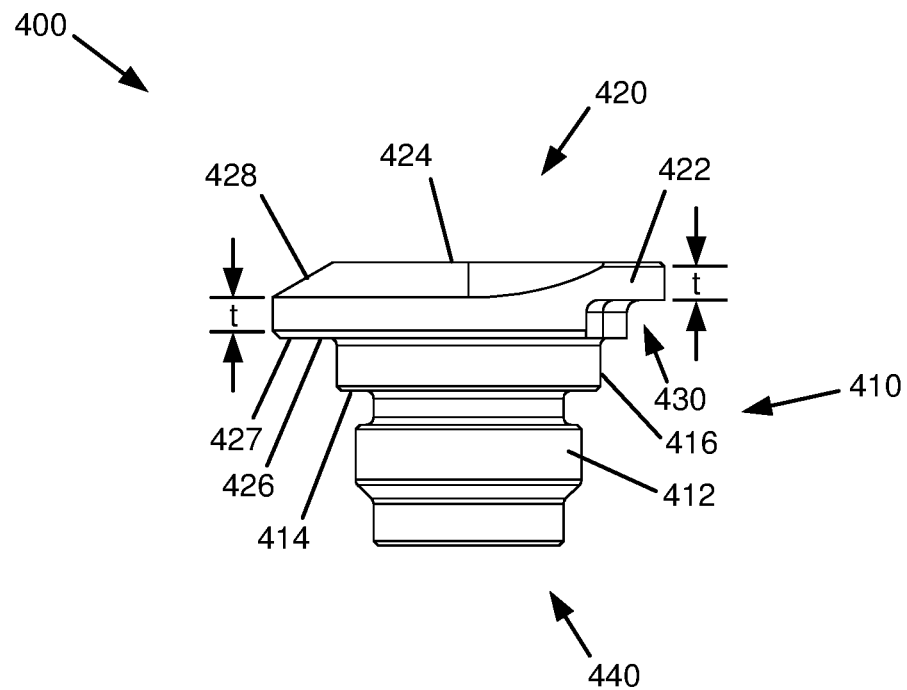

FIG. 34 is an elevation view of the bar end cap of FIG. 32.

Figure 35:
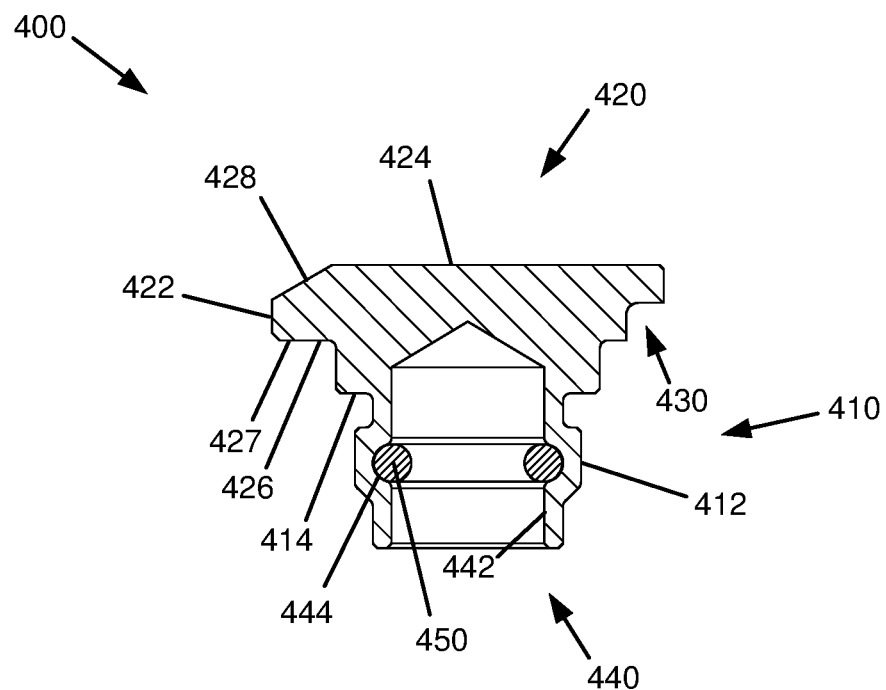

FIG. 35 is a cross-sectional view of the bar end cap of FIG. 34.

Figure 36:
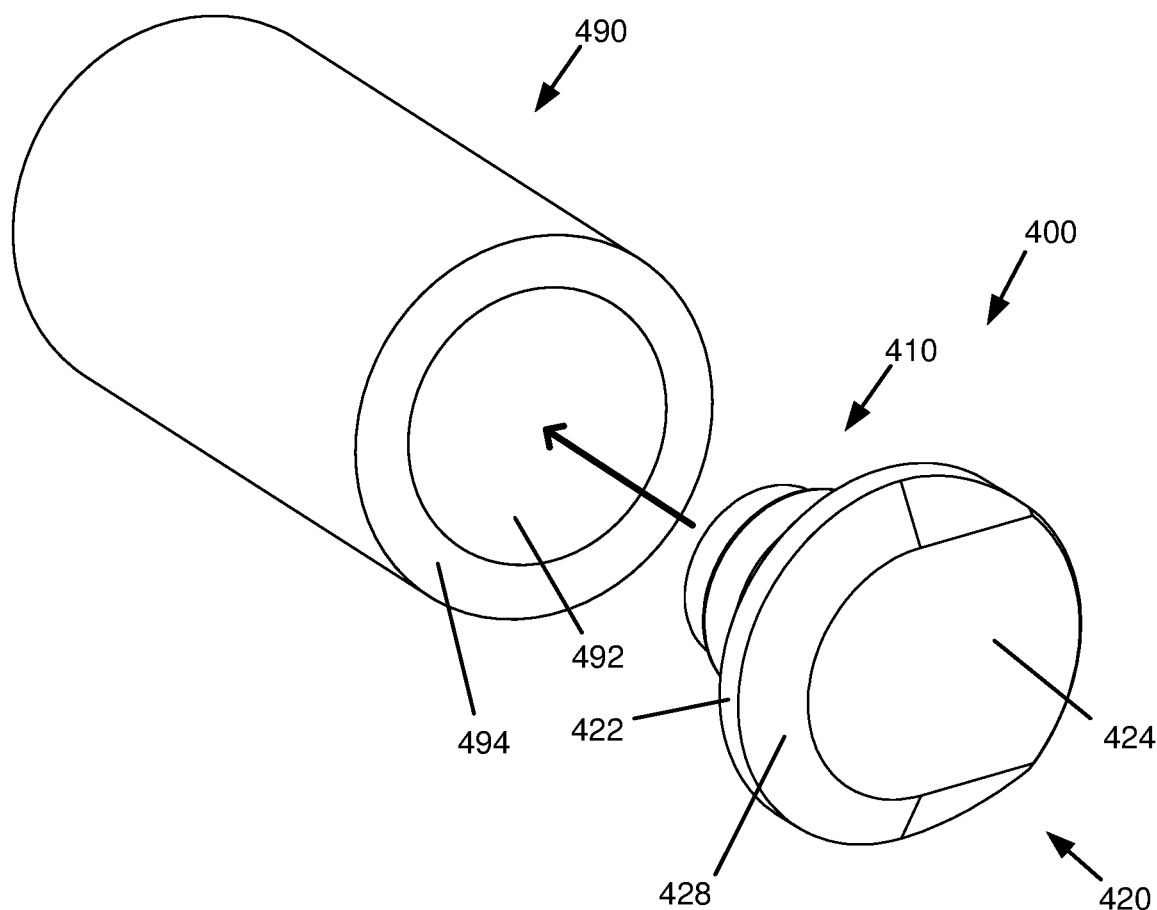
Figure 37:
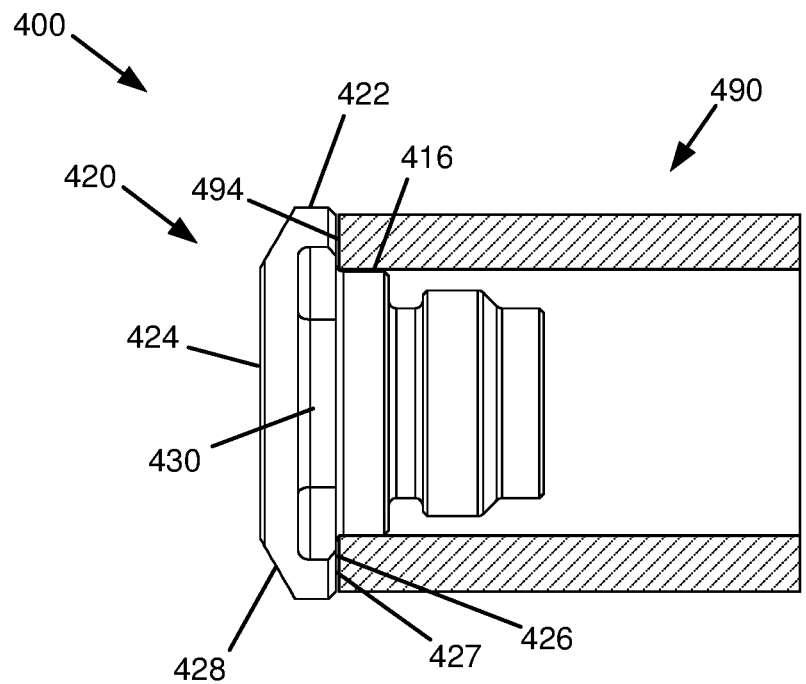

FIGS. 36 and 37 illustrate an example of use of the bar end cap of FIG. 32.

Figure 38:
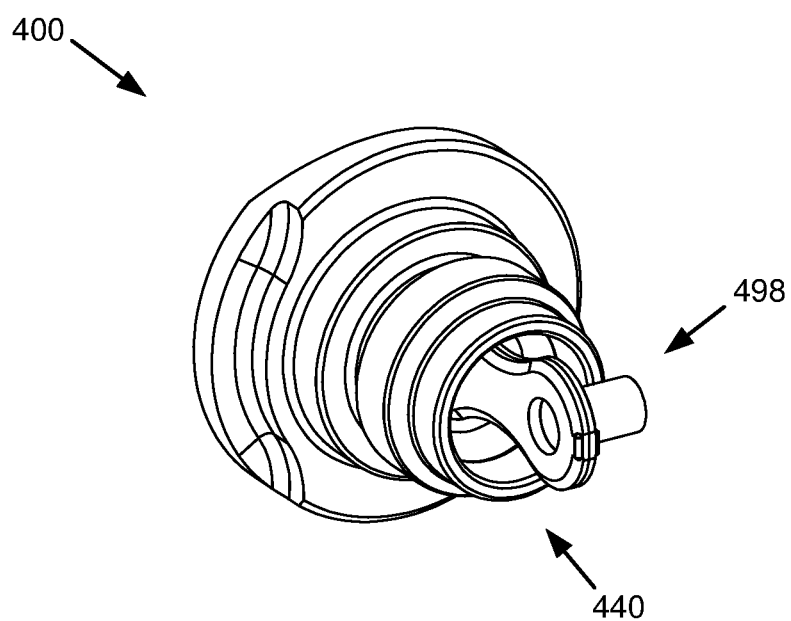
Figure 39:
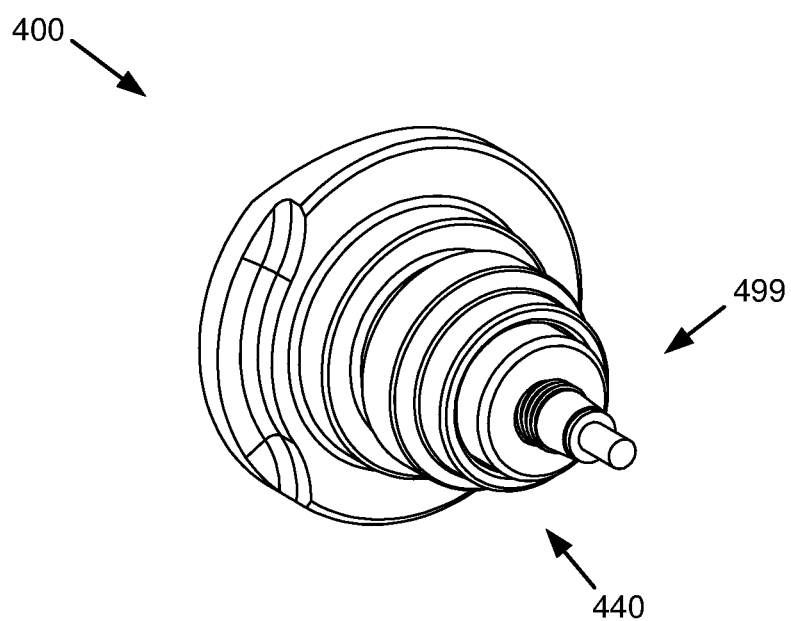

FIGS. 38 and 39 illustrate examples of use of the bar end cap of FIG. 32.

Multi-Tool Sleeve Assembly (500)

Figure 40:
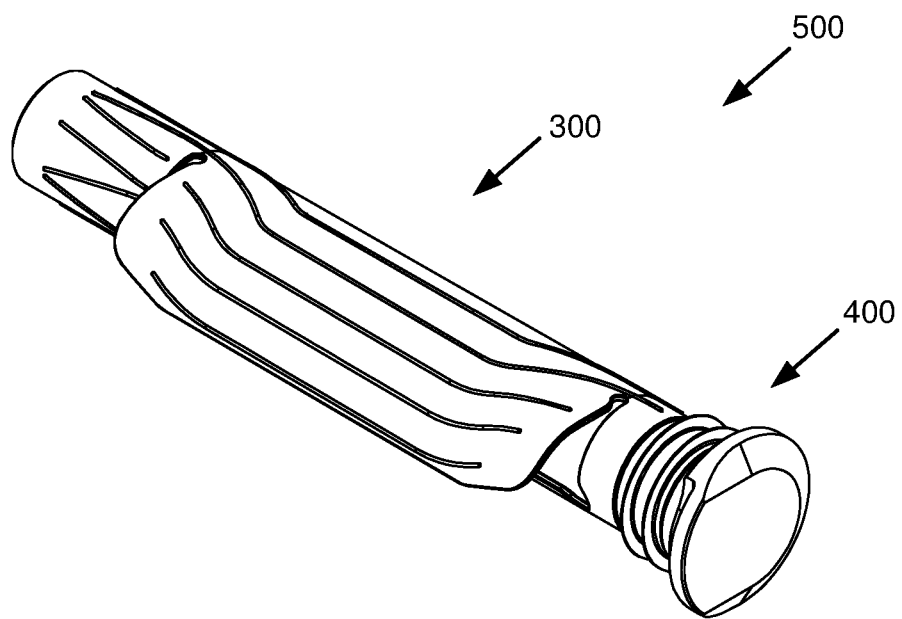

FIG. 40 is a perspective view of an example of a multi-tool sleeve assembly.

Figure 41:
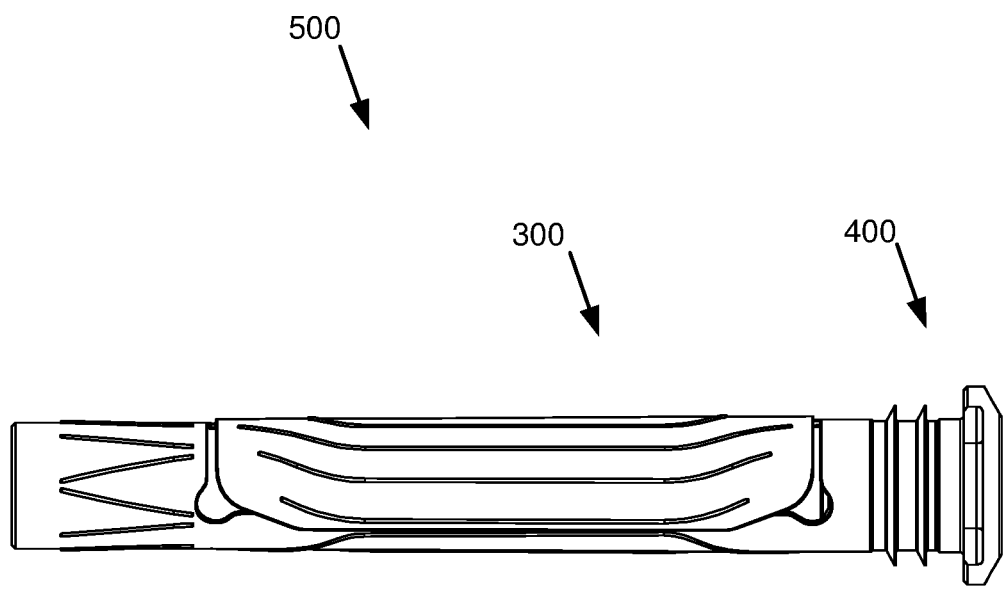

FIG. 41 is an elevation view of the multi-tool sleeve assembly of FIG. 40.

Figure 42:
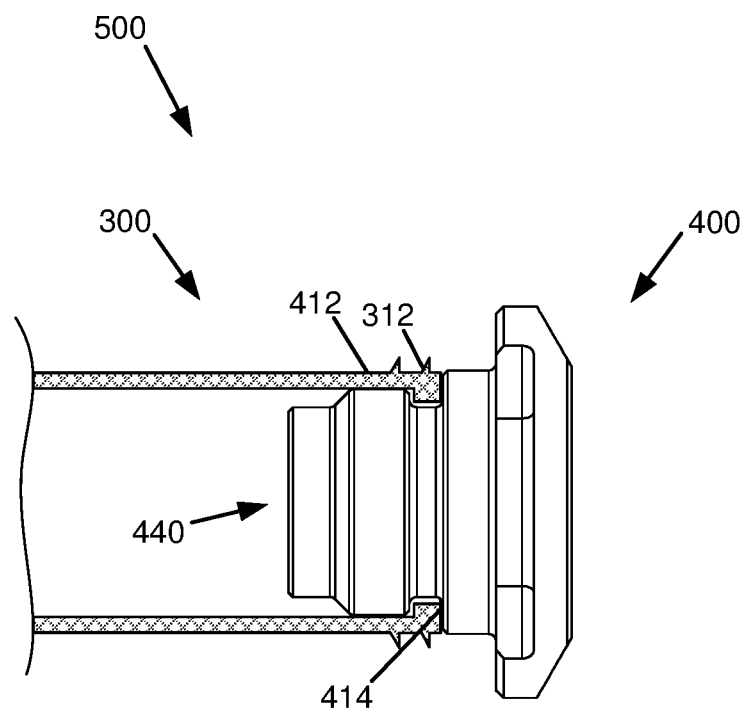

FIG. 42 is a cross-sectional view of a portion of the multi-tool sleeve assembly of FIG. 41.

Figure 43:
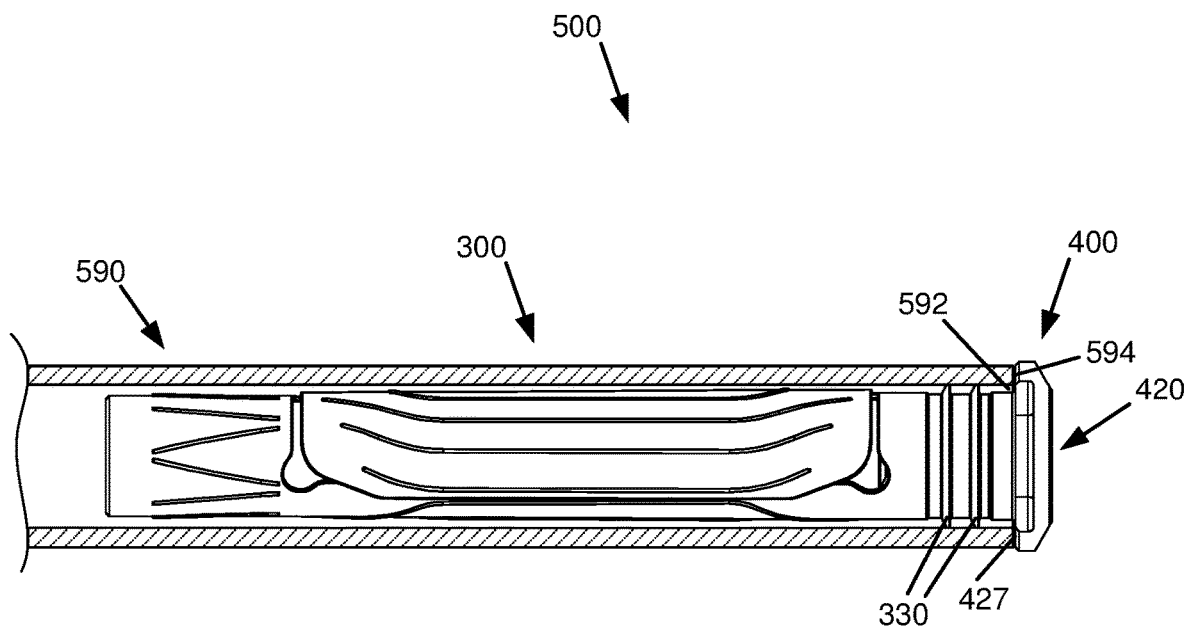

FIG. 43 illustrates an example of use of the multi-tool sleeve assembly of FIG. 40.

Figure 44:
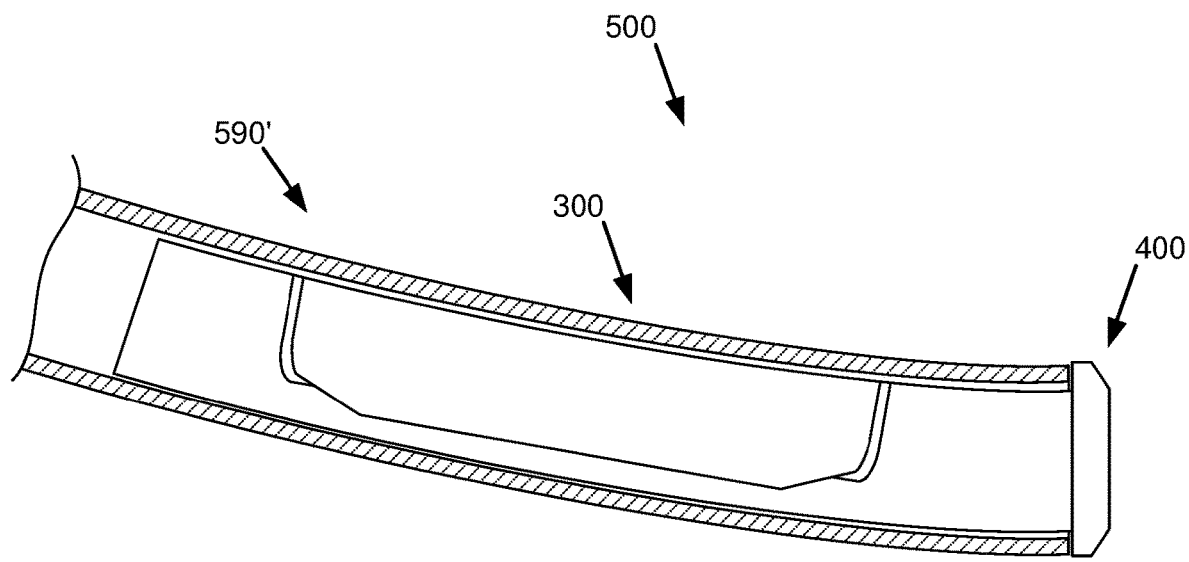

FIG. 44 schematically illustrates another example of use of the multi-tool sleeve assembly of FIG. 40.

Figure 45:
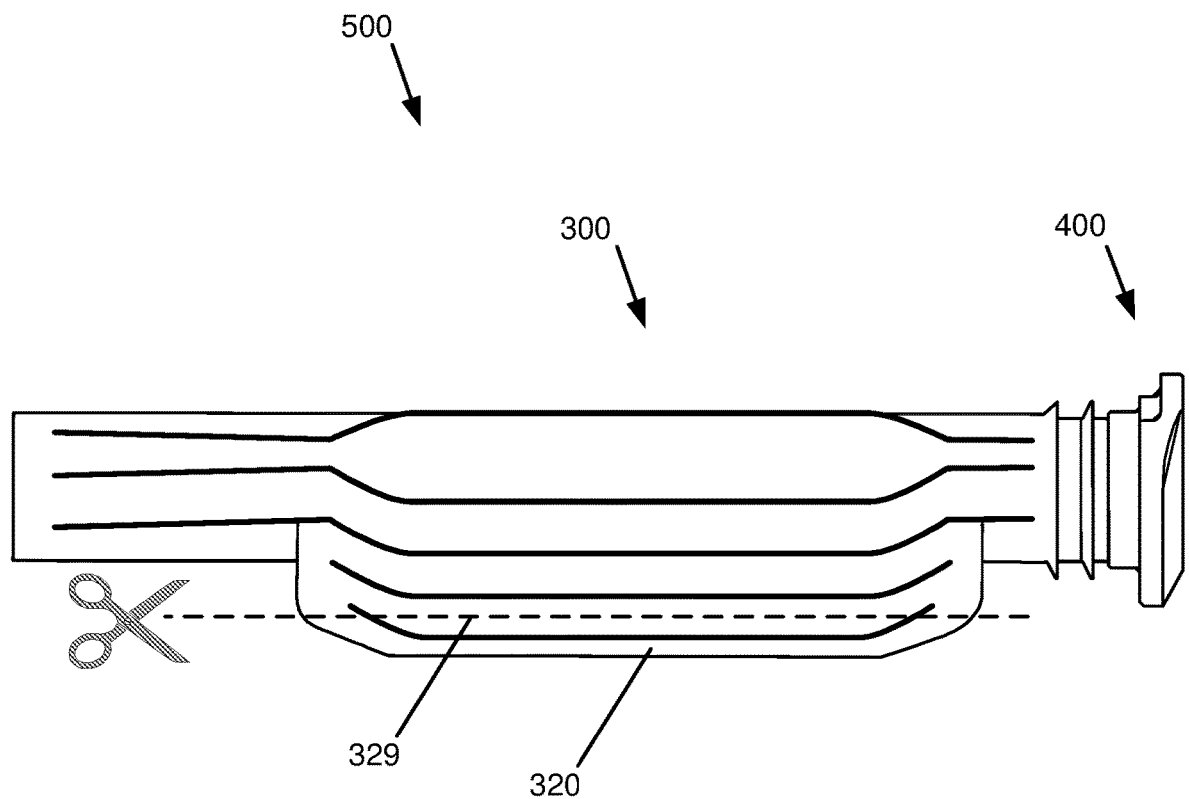

FIG. 45 is an elevation view of the multi-tool sleeve assembly of FIG. 40.

Multi-Tool System (600)

Figure 46A:
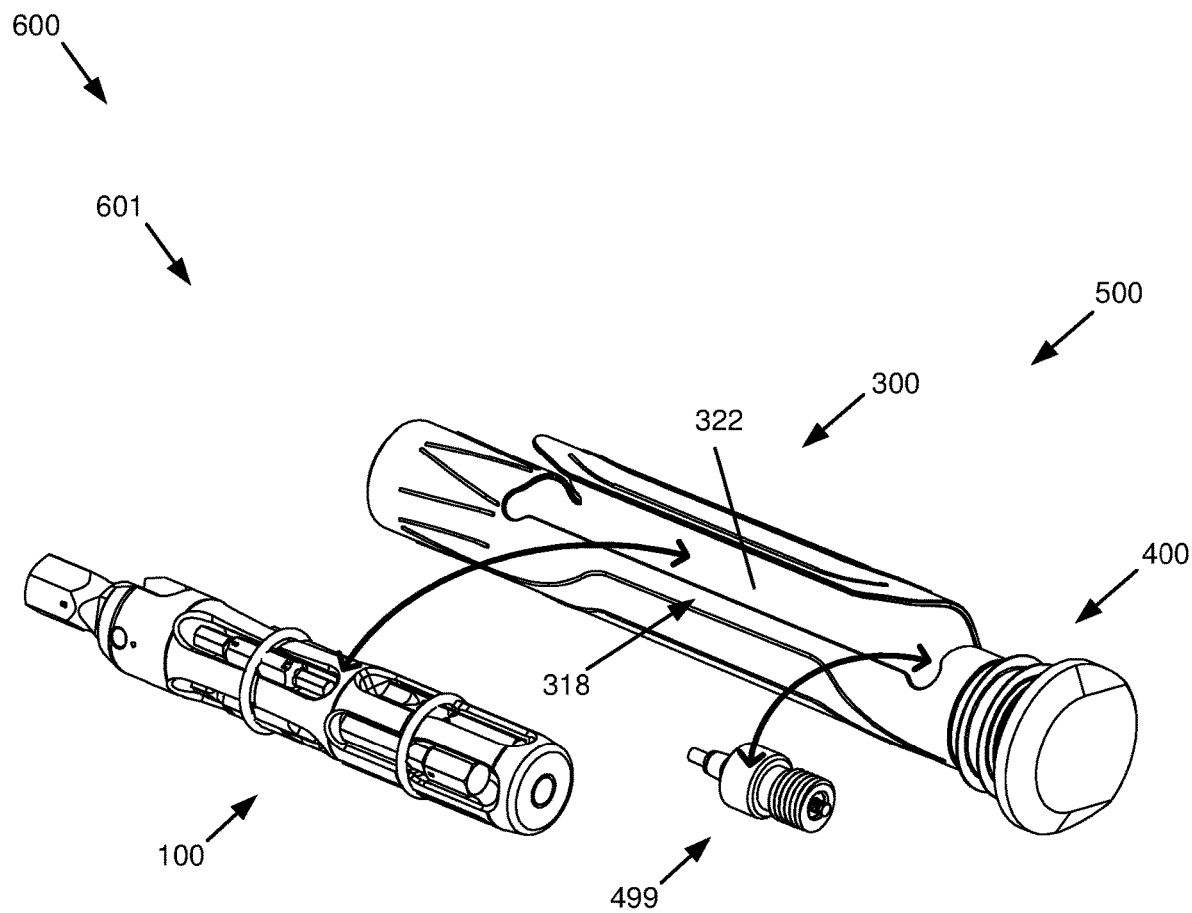
Figure 46B:
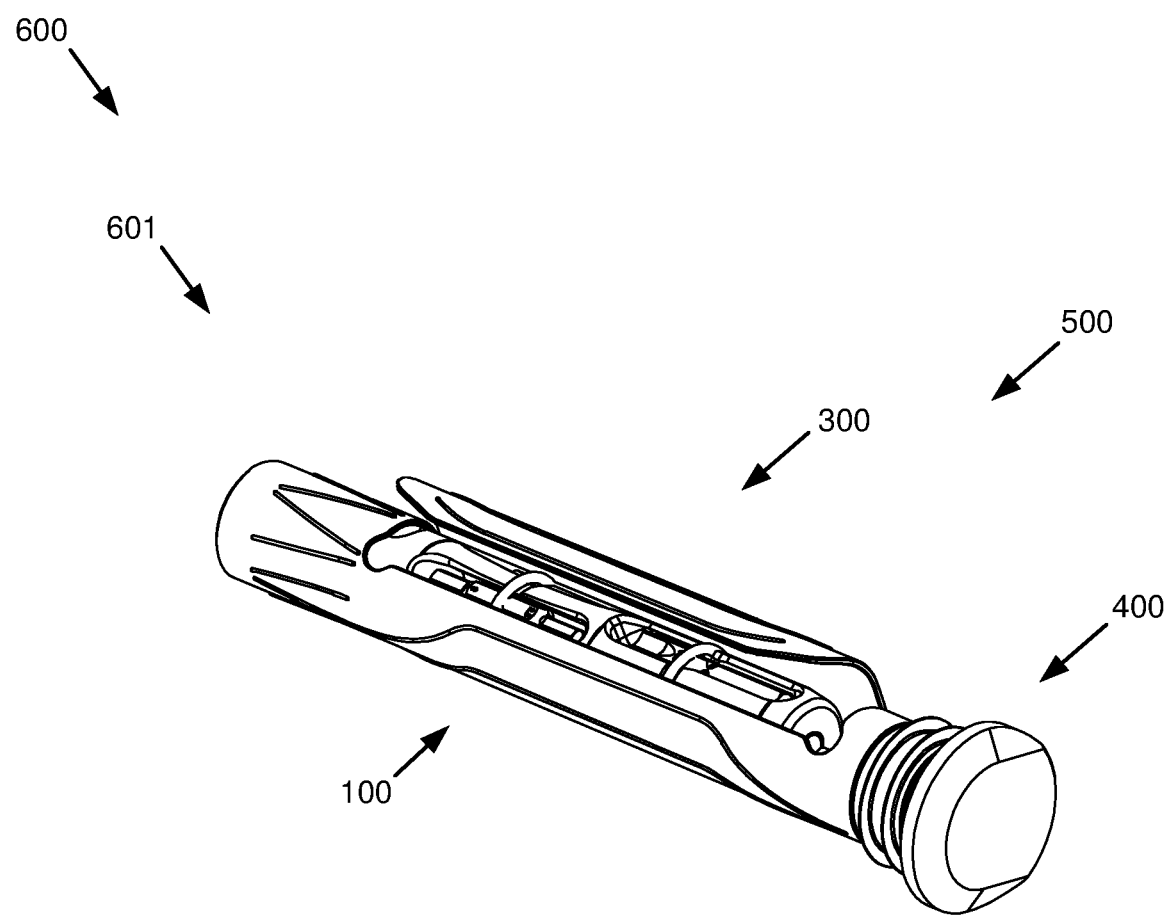

FIGS. 46A and 46B are perspective views of an example of a multi-tool system in unassembled and assembled states, respectively.

Figure 47A:
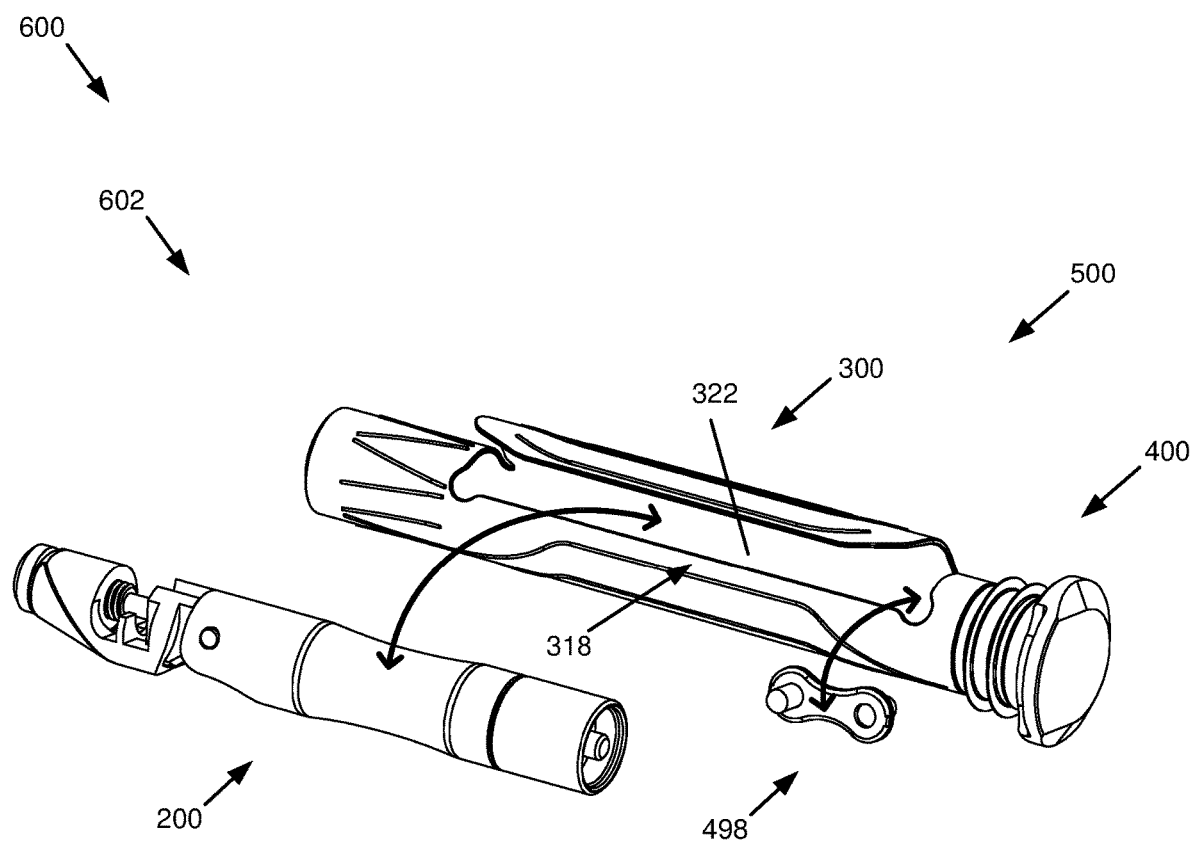
Figure 47B:
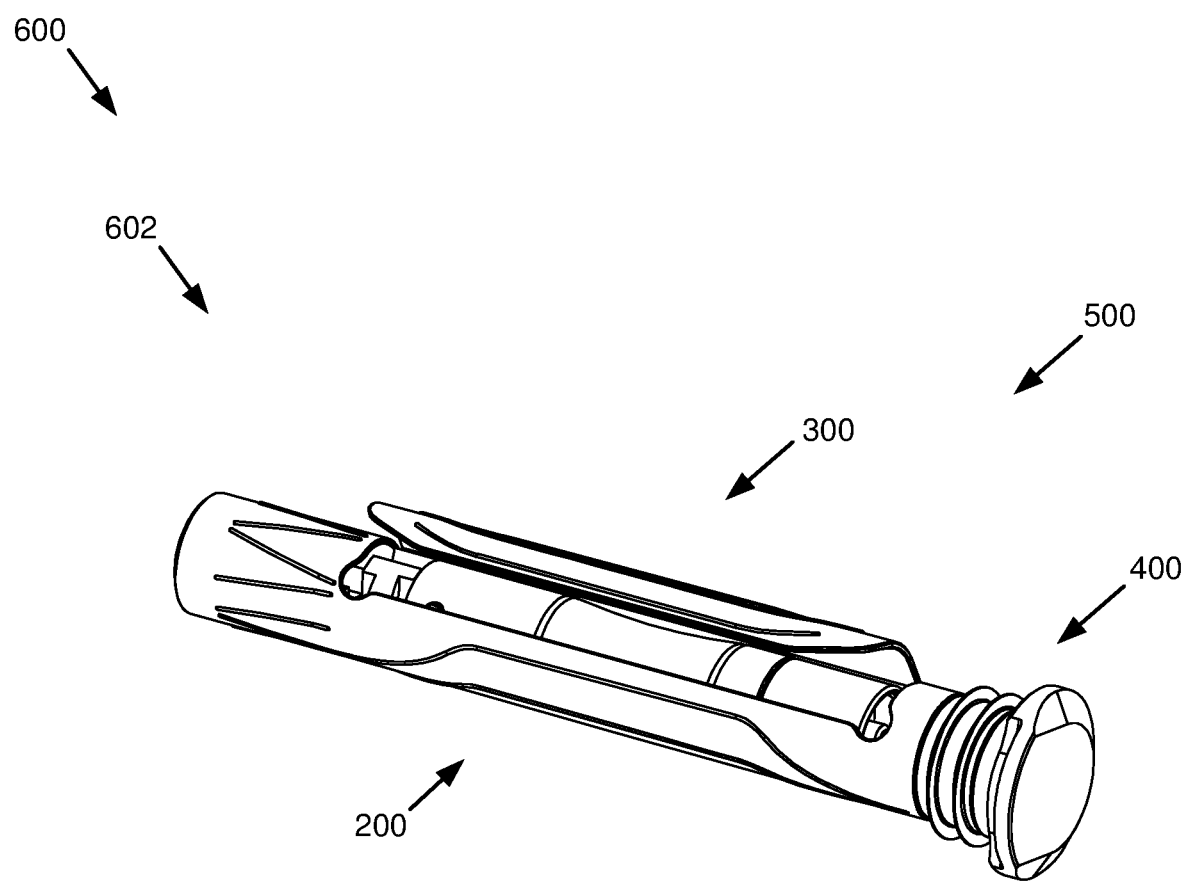
Figure 47C:
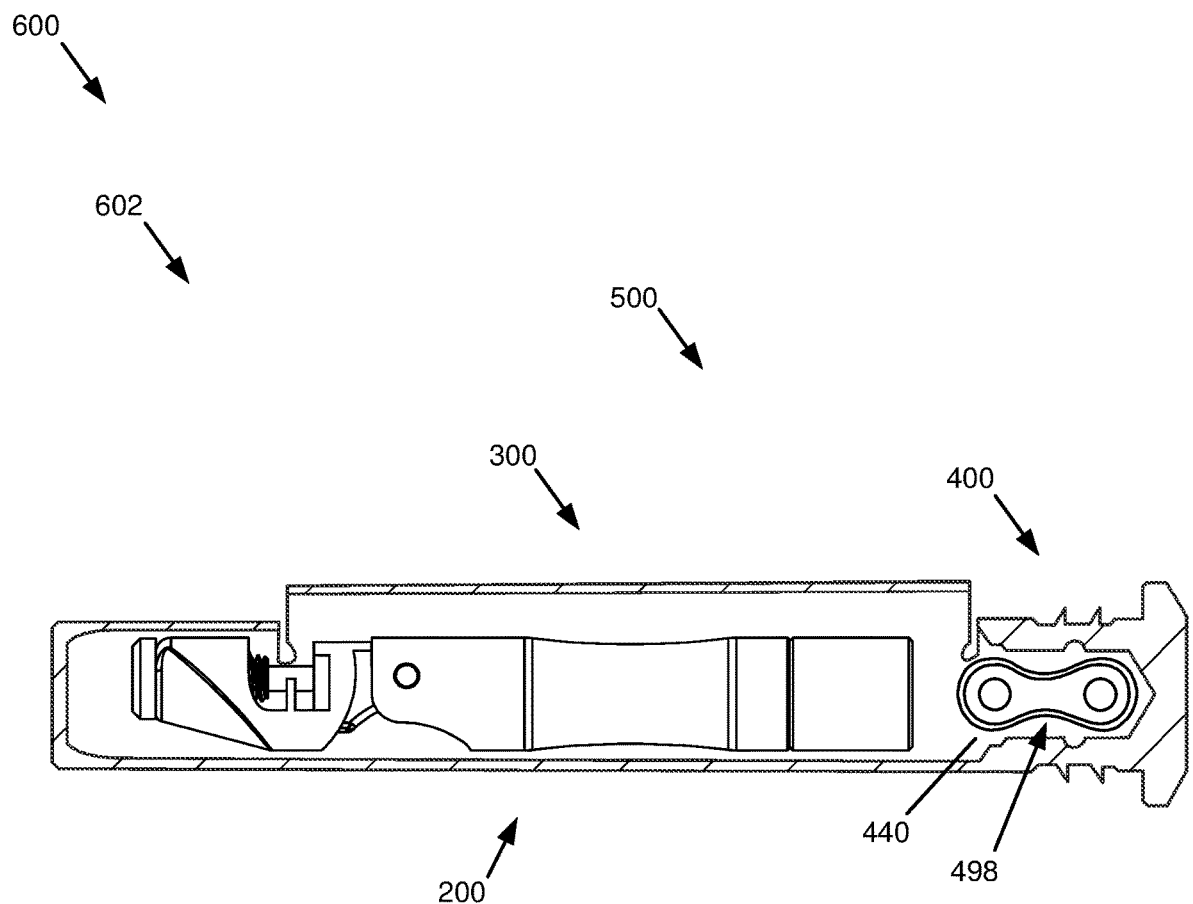

FIGS. 47A and 47B are perspective views of another example of a multi-tool system in unassembled and assembled states, respectively, and FIG. 47C is a partial cross-sectional view of the multi-tool system of FIG. 47B.

Figure 48A:
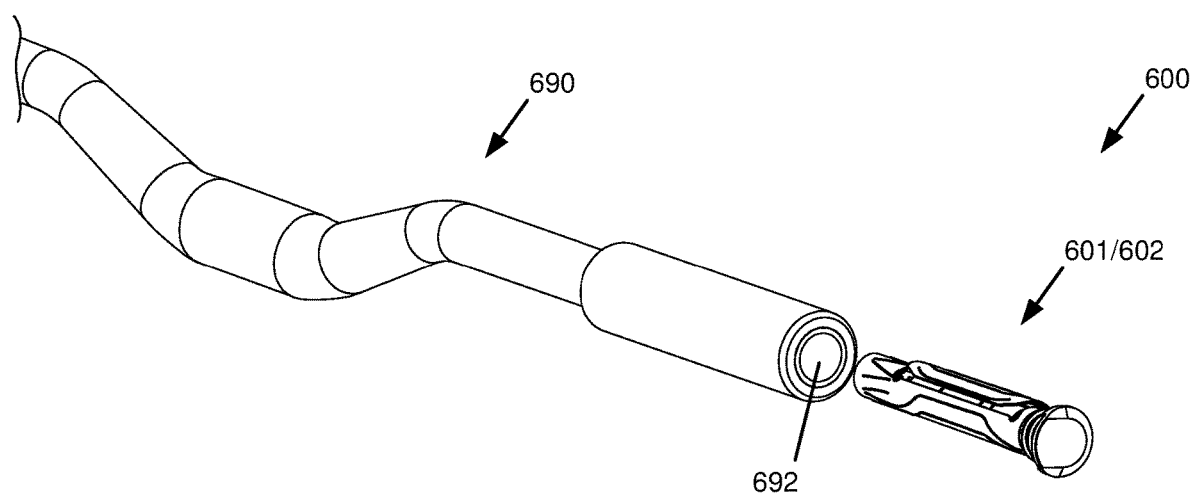
Figure 48B:
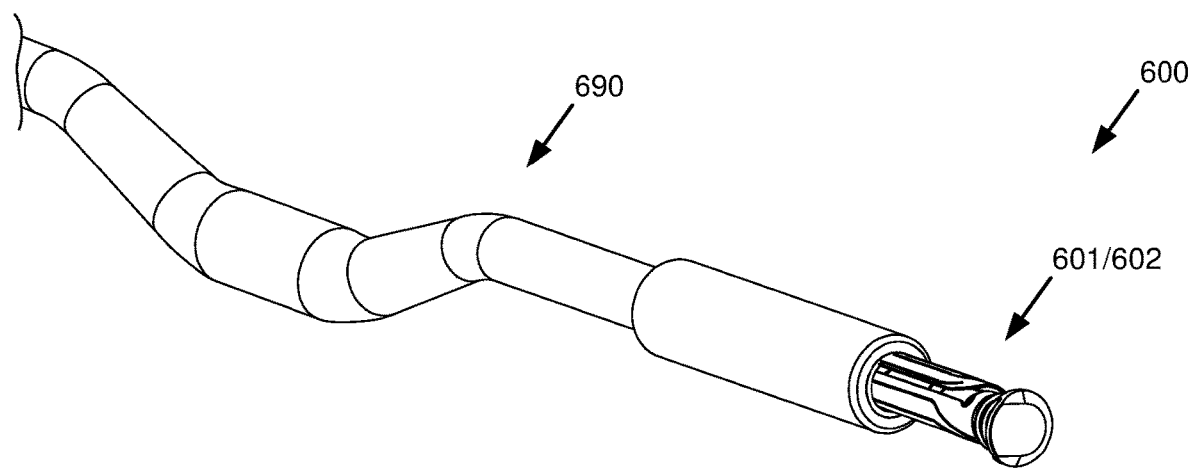
Figure 48C:
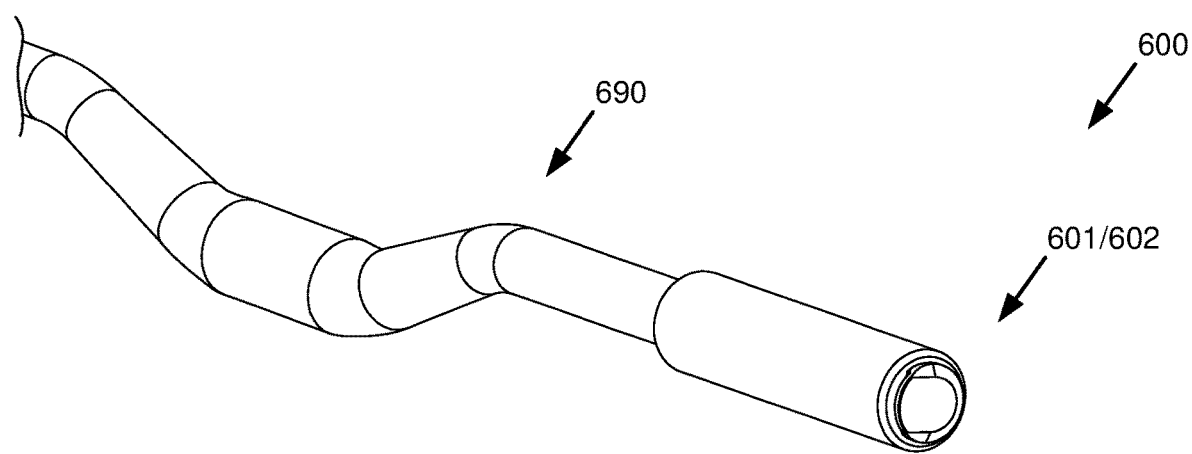

FIGS. 48A, 48B, and 48C illustrate an example of storing the multi-tool system of FIG. 46B or FIG. 47B.

Figure 49:
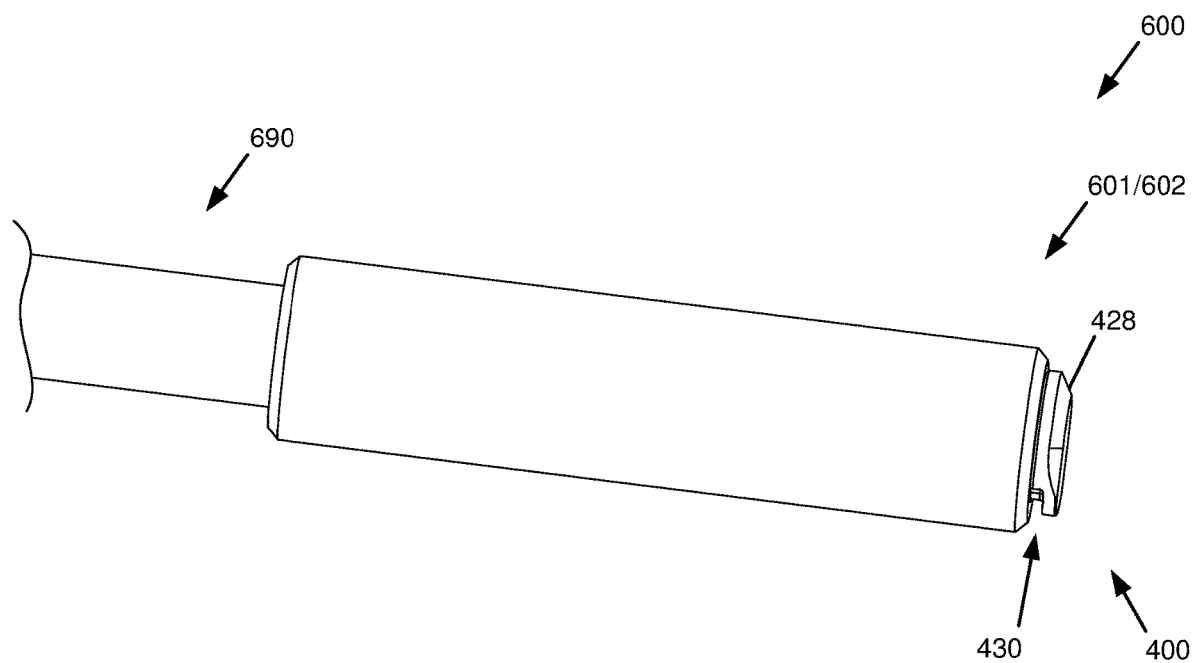

FIG. 49 illustrates an example of storing the multi-tool system of FIG. 46B or FIG. 47B.

Spoke Wrench and Valve Core Multi-Tool (700)

Figure 50:
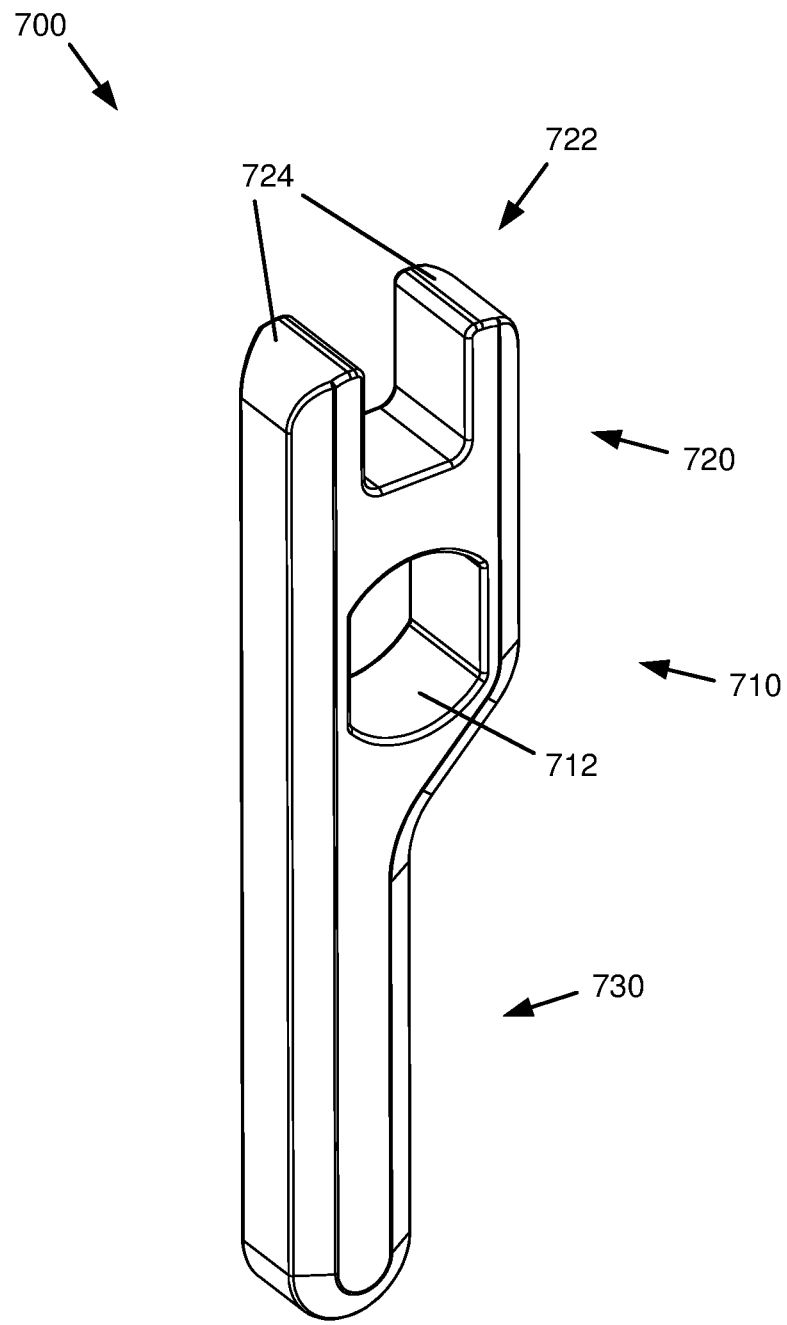
Figure 51:
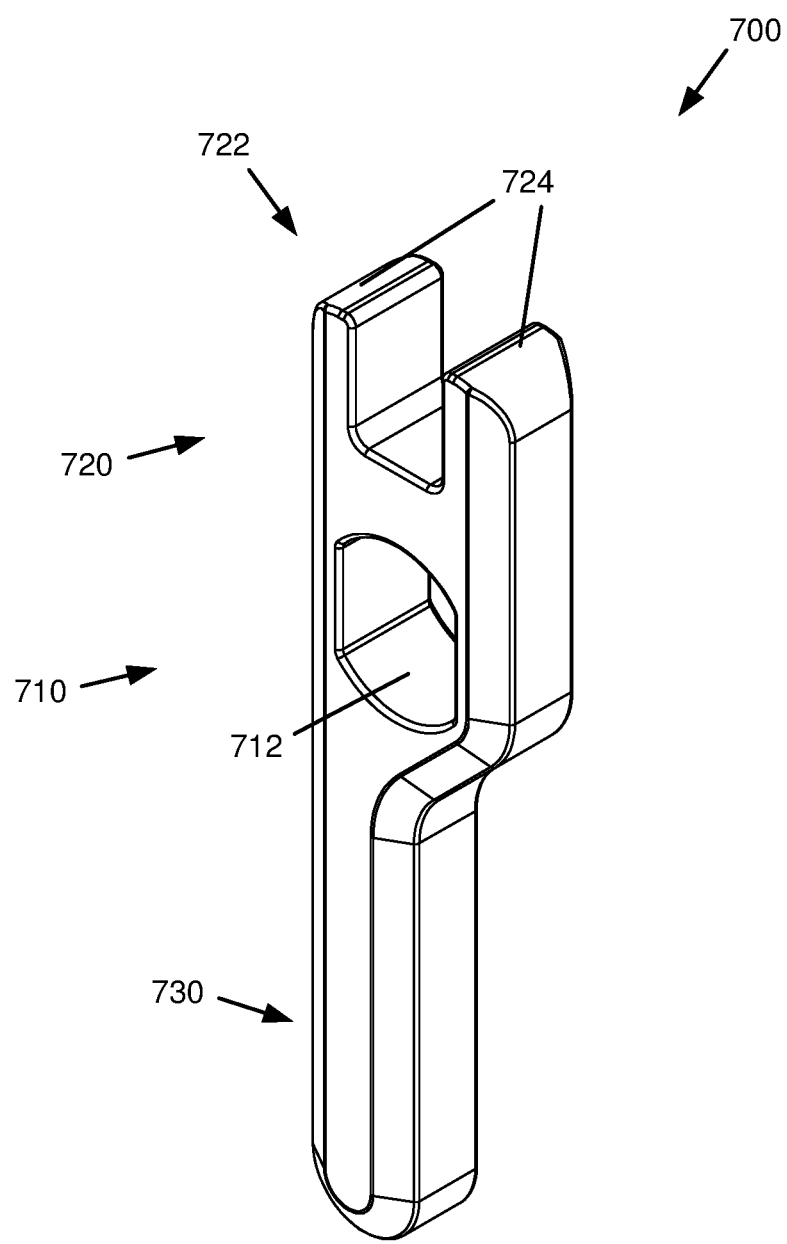

FIGS. 50 and 51 are perspective views of an example of a spoke wrench and valve core multi-tool.

Figure 52:
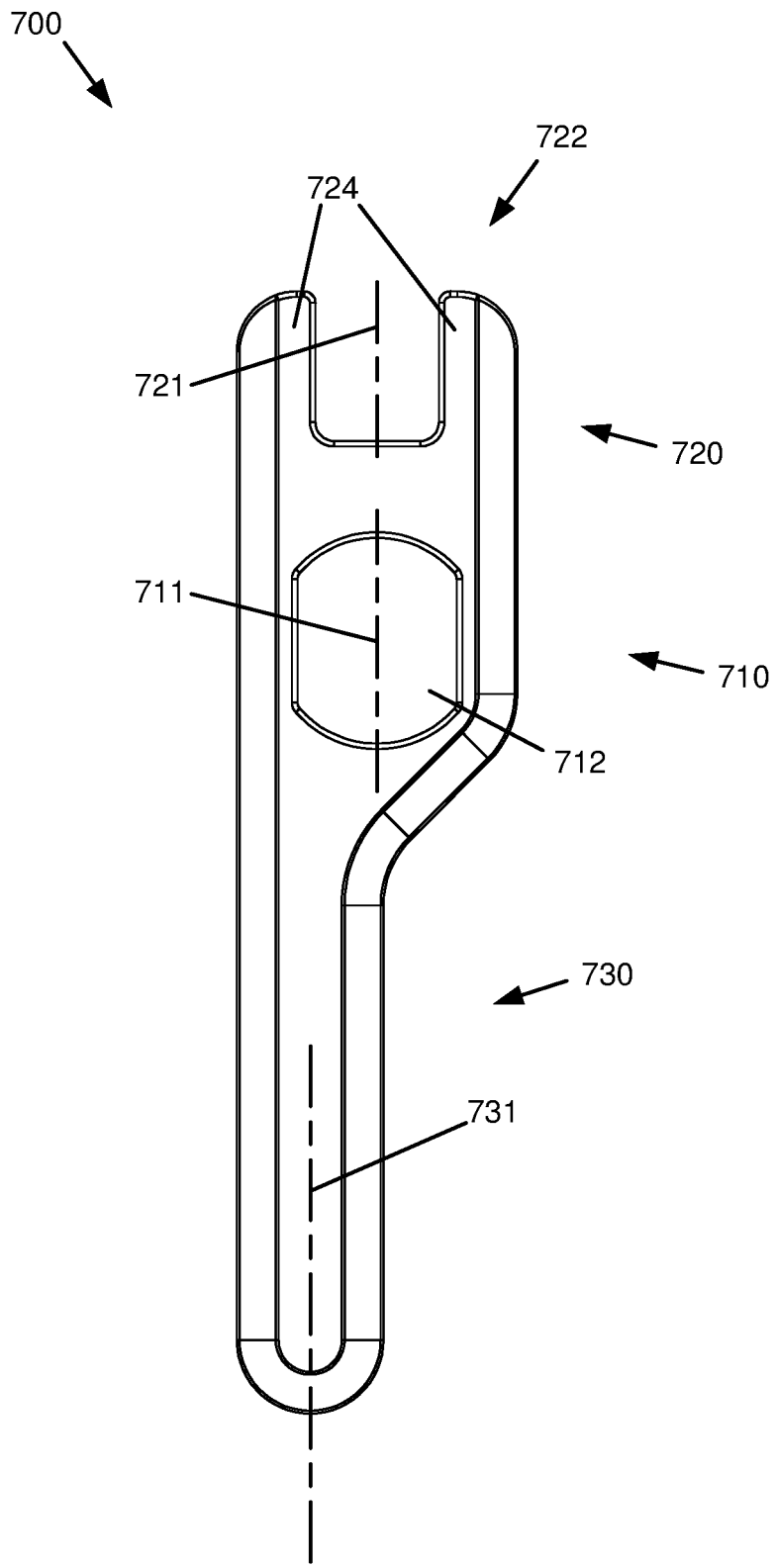

FIG. 52 is an elevation view of the spoke wrench and valve core multi-tool of FIG. 50.

FIGS. 53, 54, 55, and 56 illustrate examples of use of the spoke wrench and valve core multi-tool of FIG. 50.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure.

Bit Driver Multi-Tool (100)

Figure 1:
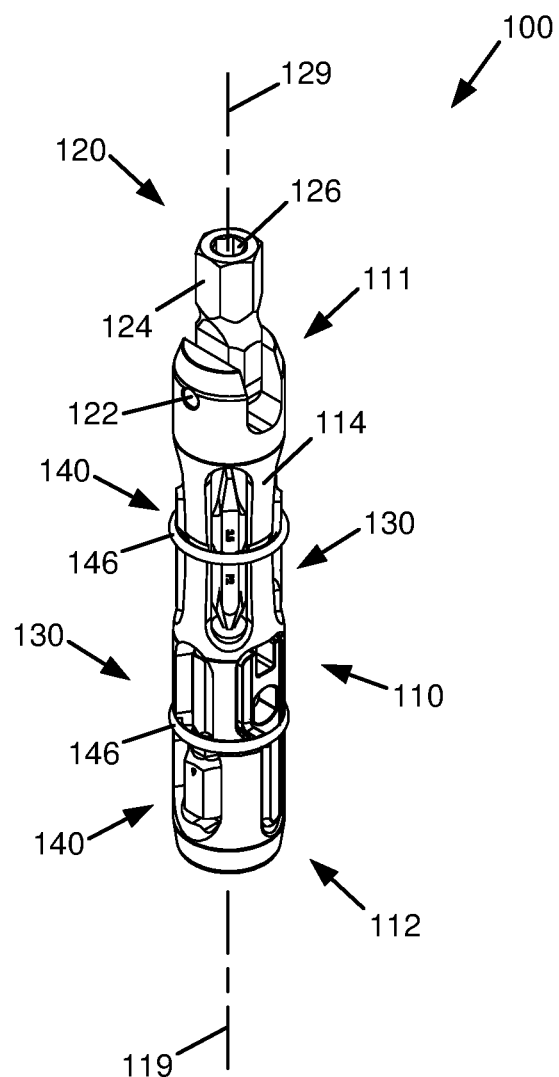
FIG. 1 is a perspective view of an example of a bit driver multi-tool, with a head of the bit driver multi-tool in a first position.
Figure 2:
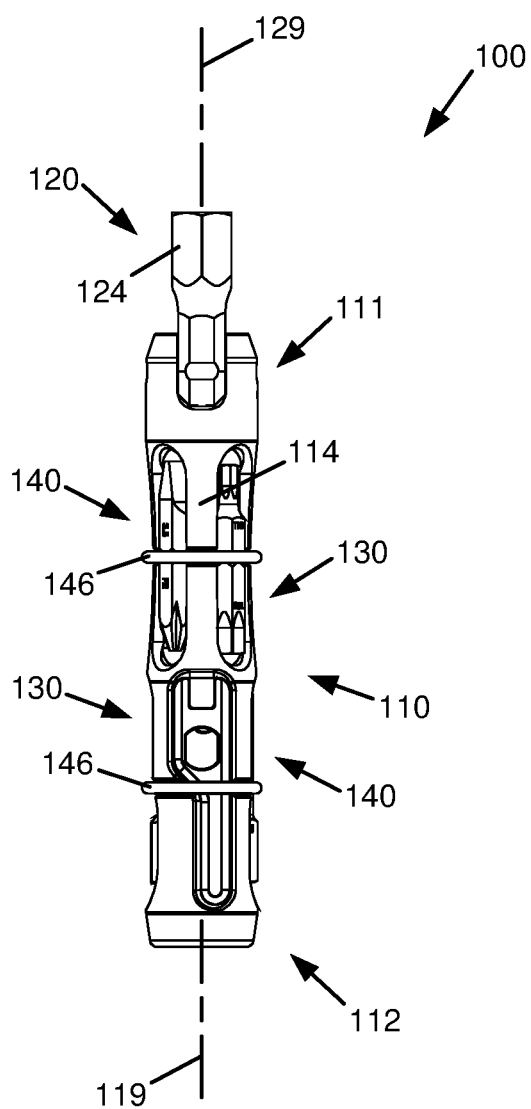
FIGS. 2, 3, 4, and 5 are elevation views of the bit driver multi-tool of FIG. 1.
Figure 3:
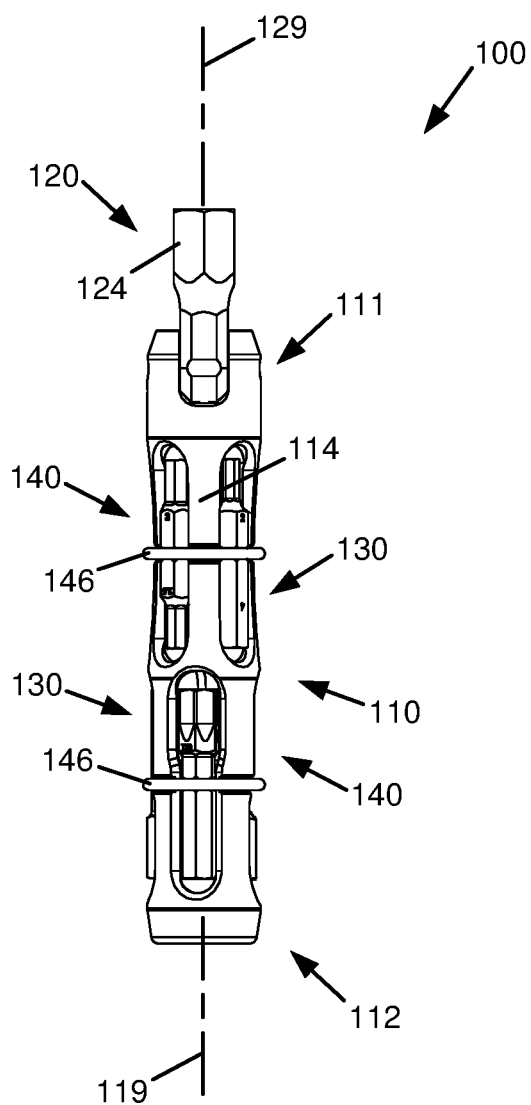
Figure 4:
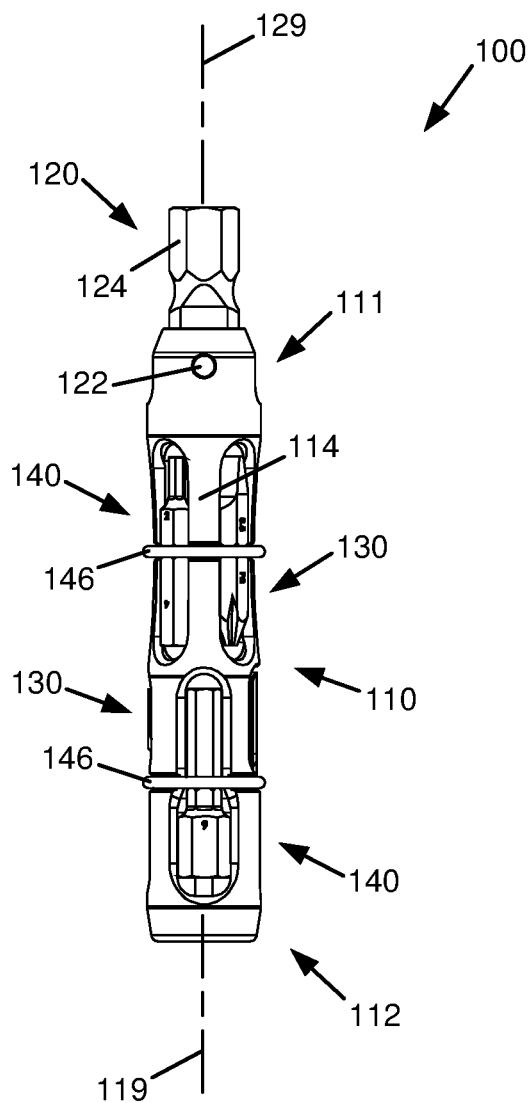
Figure 5:
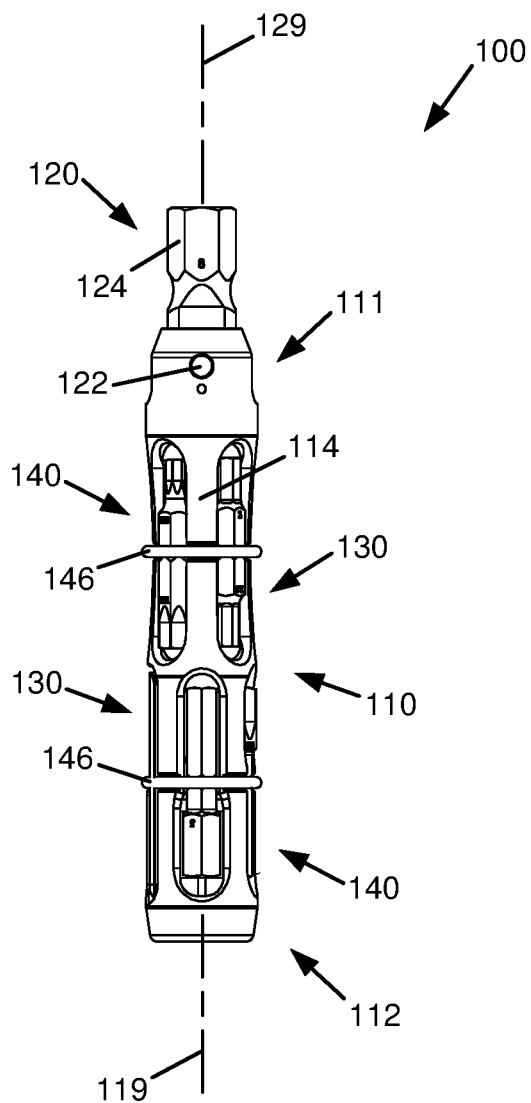

FIG. 1 is a perspective view of an example of a bit driver multi-tool, with a head of the bit driver multi-tool in a first position.

FIGS. 2, 3, 4, and 5 are elevation views of the bit driver multi-tool of FIG. 1.

Figure 6:
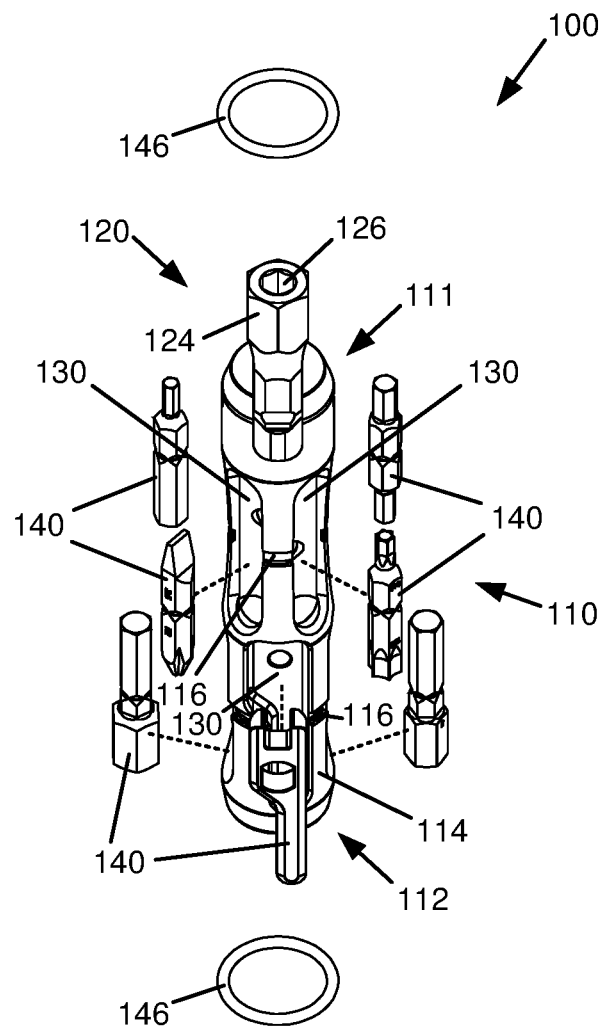
FIGS. 6 and 7 are exploded perspective views of an example of the bit driver multi-tool of FIG. 1.
Figure 7:
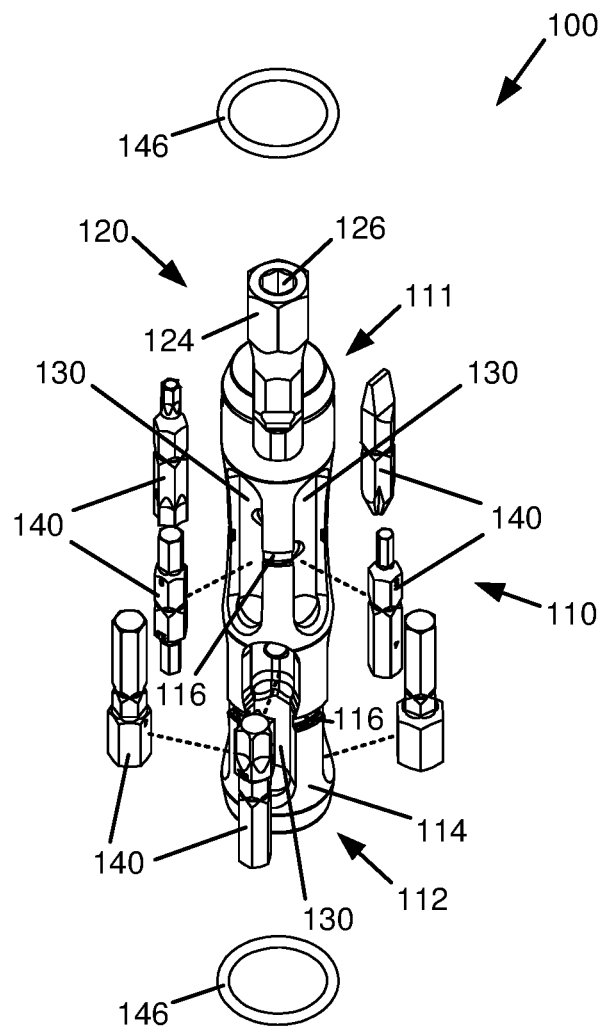

FIGS. 6 and 7 are exploded perspective views of an example of the bit driver multi-tool of FIG. 1.

Figure 8:
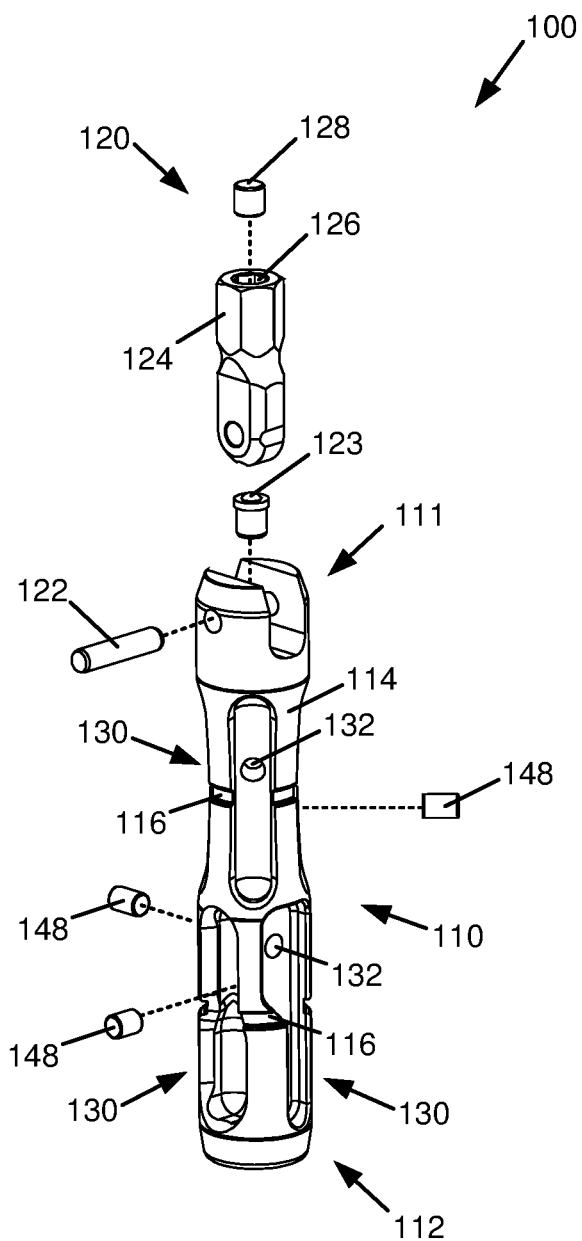
FIGS. 8 and 9 are exploded perspective views of the bit driver multi-tool of FIG. 1.
Figure 9:
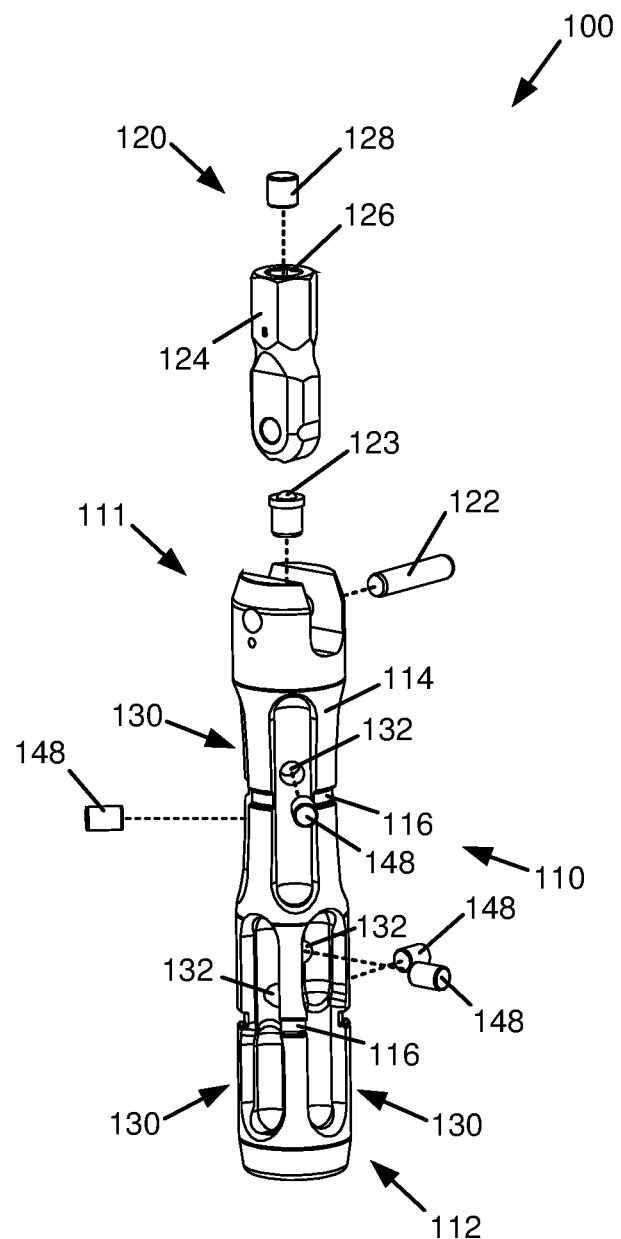

FIGS. 8 and 9 are exploded perspective views of the bit driver multi-tool of FIG. 1.

Figure 10A:
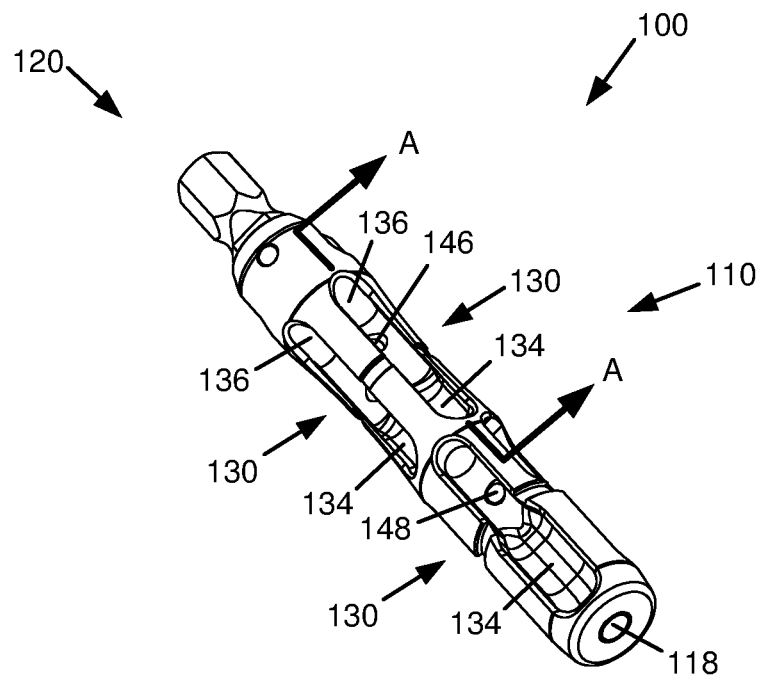
FIG. 10A is a perspective view of another example of a bit driver multi-tool.
Figure 10B:
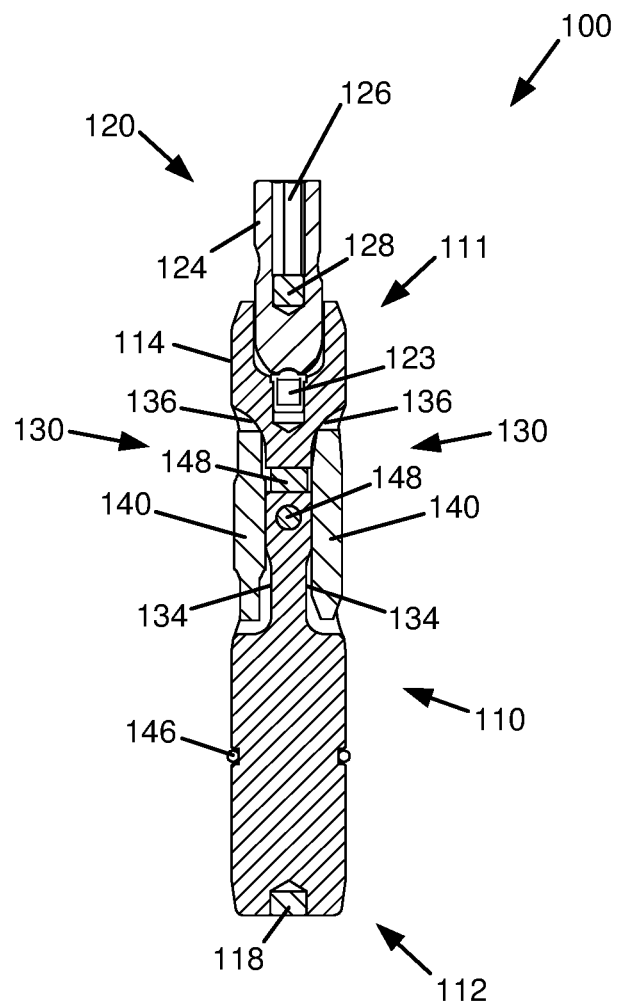
FIGS. 10B, 10C, and 10D are enlarged cross-sectional views of a portion of the bit driver multi-tool of FIG. 10A from the perspective of line A-A.
Figure 10C:
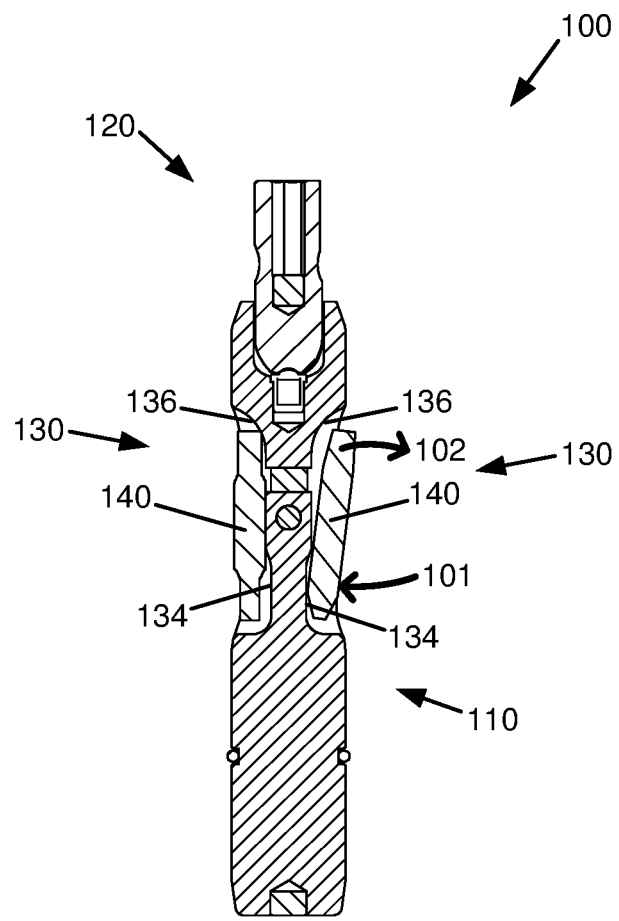
Figure 10D:
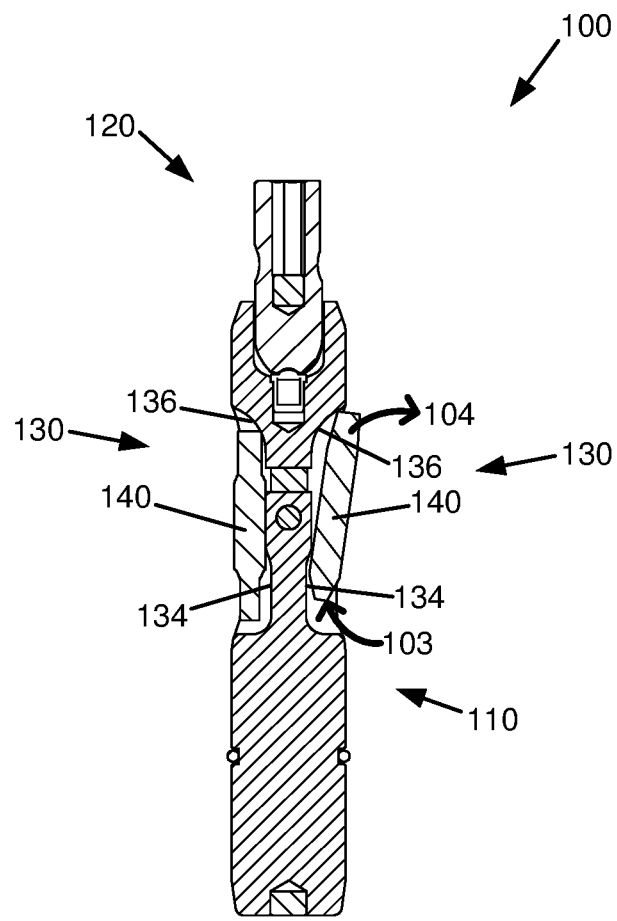

FIG. 10A is a perspective view of another example of a bit driver multi-tool, and FIGS. 10B, 10C, and 10D are enlarged cross-sectional views of a portion of the bit driver multi-tool of FIG. 10A from the perspective of line A-A.

Figure 11:
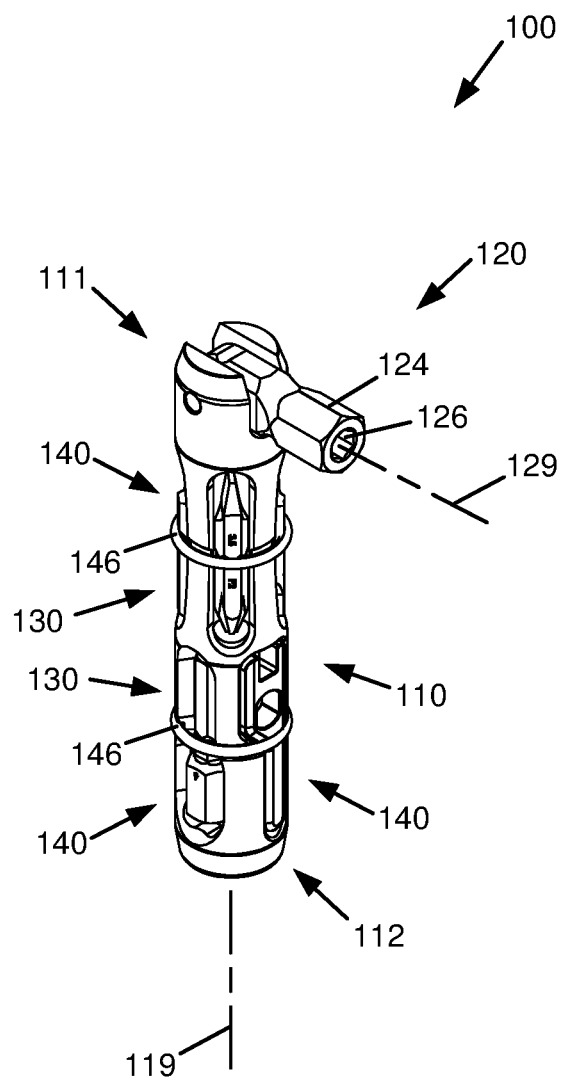
FIG. 11 is a perspective view of the bit driver multi-tool of FIG. 1, with the head of the bit driver multi-tool in a second position.

FIG. 11 is a perspective view of the bit driver multi-tool of FIG. 1, with the head of the bit driver multi-tool in a second position.

Figure 12:
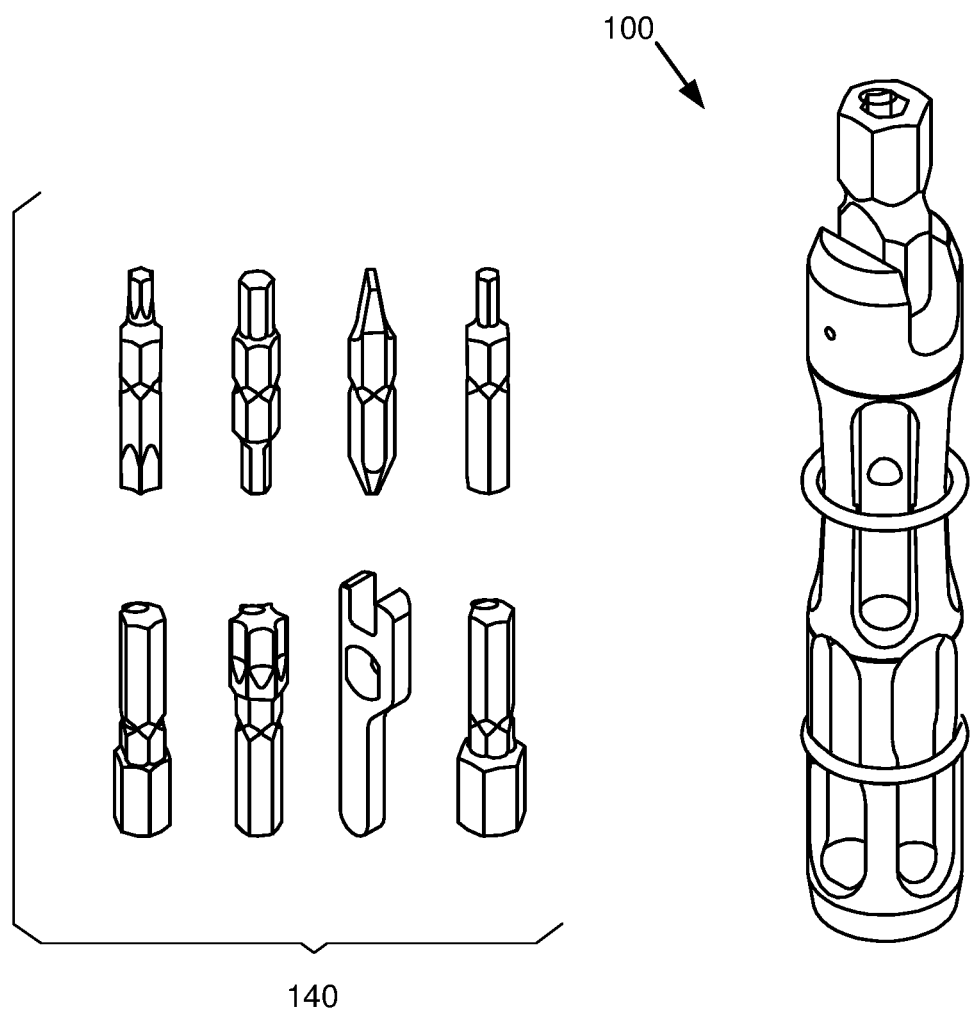
FIG. 12 is a perspective view of an example of a bit driver multi-tool, with a plurality of insert bits.

FIG. 12 is a perspective view of an example of a bit driver multi-tool, with a plurality of insert bits.

Figure 13:
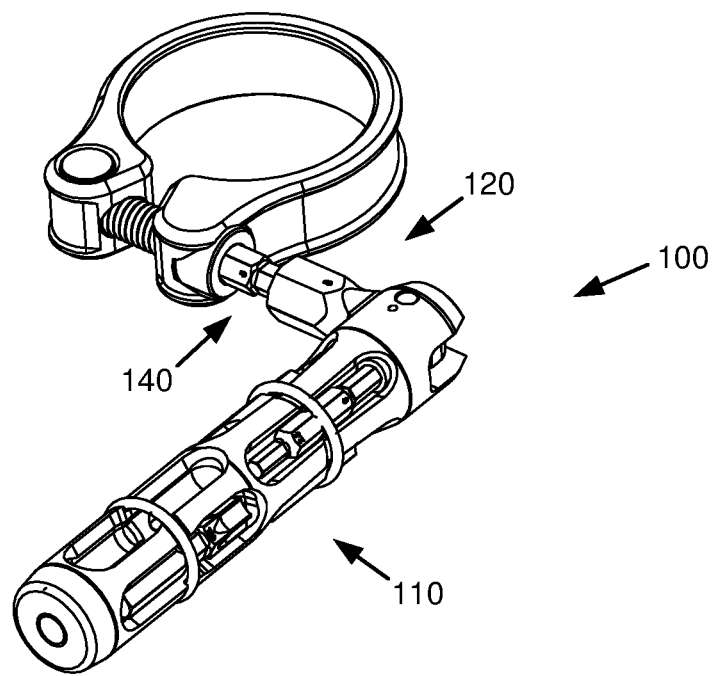
FIGS. 13 and 14 illustrate examples of use of the bit driver multi-tool of FIG. 1.
Figure 14:
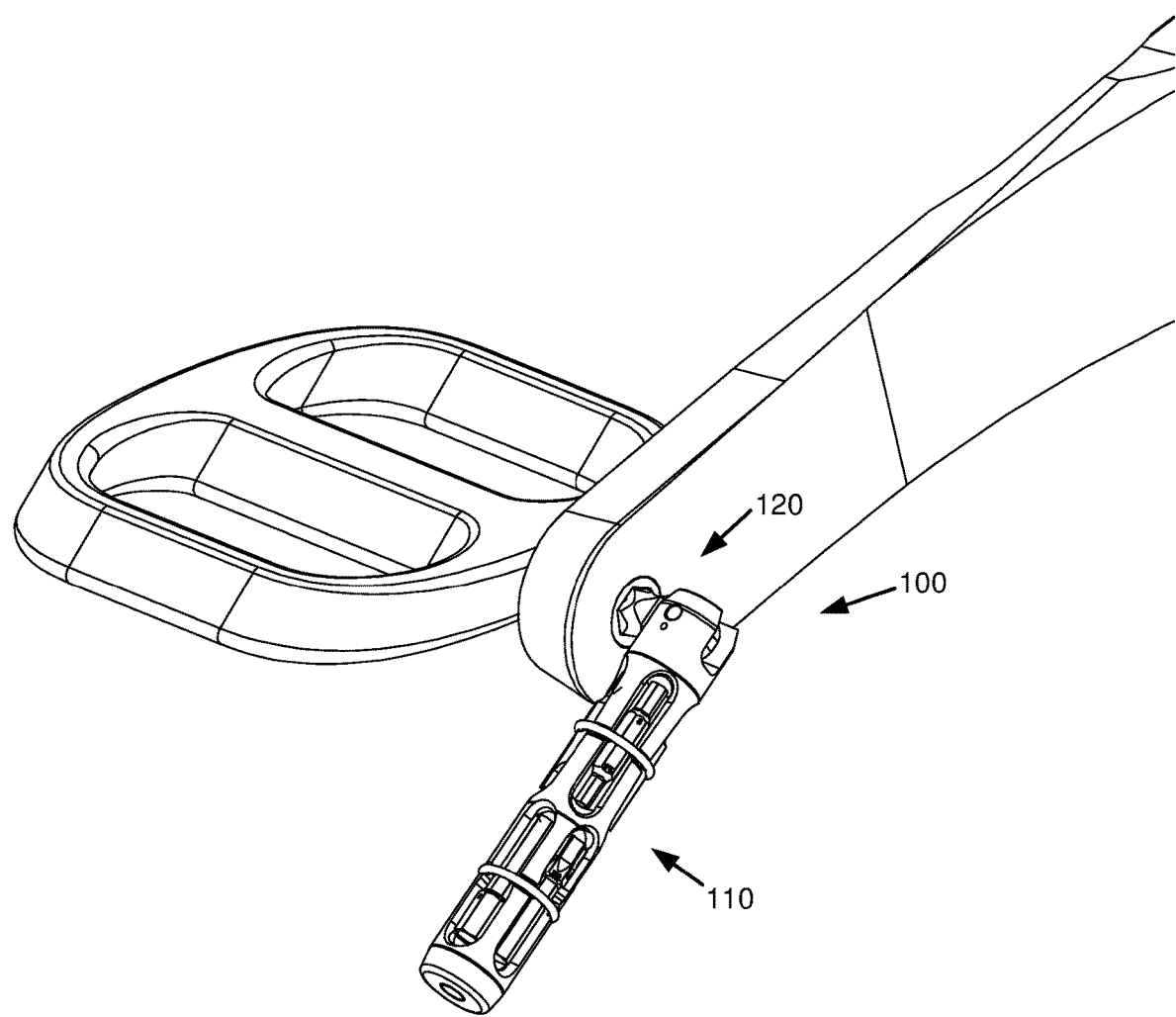

FIGS. 13 and 14 illustrate examples of use of the bit driver multi-tool of FIG. 1.

In one example, bit driver multi-tool 100 (referred to hereinafter as bit driver 100) includes a cylindrical body 110 and a head 120 extended from body 110. More specifically, in one implementation, body 110 has a first end 111 and a second end 112, with head 120 provided at (adjacent or near) first end 111.

In one implementation, head 120 is pivotally or rotatably coupled with body 110 (for example, by a pin 122) such that head 120 may be swiveled, pivoted or rotated between a first position (as illustrated, for example, in FIG. 1) and a second position (as illustrated, for example, in FIG. 11). In one example, in the first position, head 120 is aligned with body 110 such that an axis 129 of head 120 is parallel (substantially) with an axis 119 of body 110. In examples, in the second position, head 120 is oriented at an angle to body 110 such that axis 129 of head 120 is oriented at an angle to axis 119 of body 110. As illustrated in the example of FIG. 11, head 120 is oriented at an angle to body 110 such that axis 129 of head 120 is perpendicular (substantially) to axis 119 of body 110. In examples, head 120 may be swiveled, pivoted or rotated in multiple directions to establish multiple positions of head 120. In one implementation, head 120 may be swiveled, pivoted or rotated in two directions (for example, to the left and to the right) to establish two second positions of head 120.

In examples, the first position of head 120 represents a neutral position of head 120. In one implementation, with head 120 in the neutral position, bit driver 100 may be stowed or stored, as disclosed herein. In examples, the first position and the second position(s) of head 120 represent operable positions of head 120, as disclosed herein.

In the illustrated example, head 120 is a hex head 124 and includes a hex socket 126 to receive a hex insert bit, as an example of an insert bit, as disclosed herein. As such, in examples, head 120 of bit driver 100 may be used as a hex key wrench or as a driver for a hex insert bit.

In one example, body 110 of bit driver 100 includes a plurality of cavities or pockets 130 for holding or storing insert bits 140. In one implementation, pockets 130 are provided in a peripheral surface 114 of body 110 and are each sized to receive a respective insert bit 140. In the illustrated example, pockets 130 include two rows of four pockets each spaced around a periphery of body 110. As such, in the illustrated example, a total of eight insert bits 140 may be stored in pockets 130. Although two rows of four pockets each are illustrated and described, the number and/or configuration or arrangement of pockets 130 may vary.

In one example, O-rings 146 are fit around body 110 and insert bits 140 to help hold or secure insert bits 140 within respective pockets 130. In one implementation, grooves 116 are formed in peripheral surface 114 of body 110 to position respective O-rings 146 around body 110 and respective insert bits 140.

In one example, magnets 148 are provided within pockets 130 to help hold or retain insert bits 140 within respective pockets 130. In one implementation, magnets 148 are positioned within respective holes 132 provided in a bottom (base or floor) of pockets 130. In one example, a common hole extends between two opposite pockets 130 such that one magnet 148 is provided within the common hole. As such, in one implementation, four magnets 148 are used for eight pockets 130. Although illustrated as being cylindrical in shape, magnets 148 may be of a circular, rectangular, or other shape.

In one implementation, a magnet 128 is provided within head 120, and a magnet 118 is provided at second end 112 of body 110. As such, in examples, magnet 128 may hold a respective insert bit 140 within head 120, and magnet 118 may be used to magnetically couple bit driver 100 with a magnetic surface or object.

In one implementation, a detent 123 may be provided at (adjacent or near) first end 111 of body 110 to help maintain a position of head 120 as head 120 is moved between a neutral position (as illustrated, for example, in FIG. 1) and a swiveled, pivoted or rotated position (as illustrated, for example, in FIG. 11).

In one implementation, as illustrated, for example, in FIGS. 10A, 10B, and 10C, one or more of pockets 130 may include a depression or recess 134 in a bottom (base or floor) of a respective pocket 130 at (adjacent or near) a first end thereof. As such, as illustrated in the example of FIG. 10C, a first end of a respective insert bit 140 may be pushed into recess 134 (as represented, for example, by arrow 101) to tip an opposite, second end of insert bit 140 away from or out of the respective pocket 130 (as represented, for example, by arrow 102). As such, in examples, insert bit 140 may be more easily removed from a respective pocket 130.

In one implementation, as illustrated, for example, in FIGS. 10A, 10B, 10C, and 10D, one or more of pockets 130 may include a guiding surface or ramp 136 at (adjacent or near) an opposite, second end thereof (i.e., at (adjacent or near) an end of a respective pocket 130 opposite the first end thereof). As such, as illustrated in the example of FIG. 10D, a respective insert bit 140 may be pushed toward ramp 136 (as represented, for example, by arrow 103) such that ramp 136 guides or directs the opposite, second end of insert bit 140 away from or out of the respective pocket 130 (as represented, for example, by arrow 104). As such, in examples, insert bit 140 may be more easily removed from a respective pocket 130.

In one implementation, as illustrated in the example of FIG. 12, bit driver 100 includes pockets 130 for storing insert bits 140 having, for example, the following tips and/or features: Hex: 2 mm, 2.5 mm, 3 mm, 4 mm, 5 mm, 6 mm, 8 mm; Torx® compatible: T10, T25, T30; Flathead #3.5; Phillips #2; spoke wrench and valve core wrench.

FIGS. 13 and 14 illustrate examples of use of bit driver 100. For example, as illustrated in FIG. 13, head 120 of bit driver 100 may be used as a driver for an insert bit 140. In addition, as illustrated in FIG. 14, head 120 of bit driver 100 may be used as a hex key wrench.

Chain Break and Tire Plug Multi-Tool (200)

FIGS. 15 and 16 are perspective views of an example of a chain break and tire plug multi-tool, with a head of the chain break and tire plug multi-tool in a first position.

FIGS. 17, 18, 19, and 20 are elevation views of the chain break and tire plug multi-tool of FIG. 15.

FIG. 21 is an exploded perspective view of the chain break and tire plug multi-tool of FIG. 15.

FIG. 22 is a perspective view of the chain break and tire plug multi-tool of FIG. 15, with the head of the chain break and tire plug multi-tool in a second position.

FIG. 23 illustrates an example of use of the chain break and tire plug multi-tool of FIG. 15.

FIGS. 24A and 24B are exploded perspective views of the chain break and tire plug multi-tool of FIG. 15.

FIG. 25 illustrates an example of use of the chain break and tire plug multi-tool of FIG. 15.

In one example, chain break and tire plug multi-tool 200 (referred to hereinafter as chain break 200) includes a cylindrical body 210 and a head 220 extended from body 210. More specifically, in one implementation, body 210 has a first end 211 and a second end 212, with head 220 provided at (adjacent or near) first end 211. In addition, in one implementation, a cap 230 is provided at second end 212 of body 210.

In one implementation, head 220 is pivotally or rotatably coupled with body 210 (for example, by a pin 222) such that head 220 may be pivoted or rotated between a first position (as illustrated, for example, in FIG. 16) and a second position (as illustrated, for example, in FIG. 22). In one example, in the first position, head 220 is aligned with body 210 such that an axis 229 of head 220 is parallel (substantially) with an axis 219 of body 210. In one example, in the second position, head 220 is oriented at an angle to body 210 such that axis 229 of head 220 is perpendicular (substantially) to axis 219 of body 210. In one implementation, body 210 includes a notch or undercut 214 at (adjacent or near) first end 211 to accommodate or receive and/or support head 220 when head 220 is pivoted or rotated to the second position.

In examples, the first position of head 220 represents a neutral position of head 220. In one implementation, with head 220 in the neutral position, chain break 200 may be stowed or stored, as disclosed herein. In examples, the second position of head 220 represents an operable position of head 220, as disclosed herein.

In the illustrated example, head 220 includes a cradle 224 to support a segment of a roller chain, and an extractor bolt 226 having a push pin or breaker pin 227 such that push pin or breaker pin 227 may be advanced (or retracted) with extractor bolt 226 to engage a link pin of a roller chain, as disclosed herein.

FIG. 23 illustrates an example of use of chain break 200. For example, chain break 200 may be used as a chain break tool. More specifically, as illustrated in the example of FIG. 23, a segment of a roller chain 240 may be positioned in cradle 224 of head 220 such that push pin or breaker pin 227 of extractor bolt 226 may engage a link pin 242 of roller chain 240 to extract (or insert) link pin 242. During use as a chain break tool, body 210 of chain break 200 may be held by a user as extractor bolt 226 is advanced (or retracted), for example, by a hex key wrench or hex insert bit.

In one example, as illustrated in FIG. 24A, cap 230 may be removed from body 210. As such, in examples, an interior of body 210 may be accessed. In one implementation, at least a portion of the interior of body 210 is hollow or open and provides a space for storage.

In one implementation, as illustrated in FIGS. 24A and 24B, a tire plug fork or inserter 236 extends from cap 230 such that cap 230 may be removed from body 210 (as represented, for example, by arrow 201), inverted (as represented, for example, by arrow 202), and re-coupled with body 210 (as represented, for example, by arrow 203) such that tire plug fork or inserter 236 extends from body 210, as illustrated in the example of FIG. 25. In one implementation, tire plug 238 (or an additional tire plug) may be stored within an interior of body 210, as represented by broken lines 239.

In one implementation, opposite ends of cap 230 include respective threads 231 (FIG. 24A) and threads 232 (FIG. 24B) that interchangeably mate with threads 216 provided at (adjacent or near) second end 212 of body 210. As such, threads 231 or threads 232 of cap 230 may be threadingly mated with threads 216 of body 210 to reversibly couple cap 230 with body 210 based on an orientation of cap 230.

FIG. 25 illustrates an example of use of chain break 200. For example, chain break 200 may be used to hold and insert a tire plug 238, for example, into a tire.

Multi-Tool Storage Sleeve (300)

FIGS. 26, 27, and 28 are perspective views of an example of a multi-tool storage sleeve, with a flap of the multi-tool storage sleeve in an open position.

FIG. 29 is a perspective view of the multi-tool storage sleeve of FIG. 26, with the flap of the multi-tool storage sleeve in a closed position.

FIGS. 30 and 31 illustrate examples of use of the multi-tool storage sleeve of FIG. 26.

In one example, multi-tool storage sleeve 300 (referred to hereinafter as sleeve 300) is a cylindrical or tubular member and has an open end 312 and a closed end 314 opposite open end 312. In the illustrated example, closed end 314 includes a vent hole 315.

In one implementation, sleeve 300 has an opening 318 formed in a side thereof and includes a flap 320 that may be opened and closed to reveal (substantially) and conceal (substantially) opening 318. In examples, an interior of sleeve 300, as accessed through opening 318, forms a pocket or chamber 322 for storage.

In one example, flap 320 is formed by and/or forms a portion of sleeve 300. In one implementation, flap 320 is hinged with sleeve 300 along an axis oriented parallel (substantially) with a longitudinal axis 309 of sleeve 300 such that flap 320 may be opened by rotation in a direction away from opening 318 (for example, clockwise in the illustrated example of FIG. 28, as represented by arrow 301), and may be closed by rotation in a direction toward opening 318 (for example, clockwise in the illustrated example of FIG. 29, as represented by arrow 302).

In the illustrated example, sleeve 300 includes outwardly protruding annular rings or barbs 330 at (adjacent or near) open end 312. In examples, barbs 330 provide friction-fit of sleeve 300 within a hollow bar, as disclosed herein. Although sleeve 300 is illustrated as including two barbs 330, sleeve 300 may include any number of barbs 330 (including no barbs).

In one example, sleeve 300 is formed of a polymer material. In one implementation, the polymer material is a flexible polymer material, such as, for example, an EPDM rubber material. As such, in examples, sleeve 300 (including flap 320) is flexible.

In the illustrated example, an outer surface of sleeve 300 includes ribs 340 spaced around a circumference of sleeve 300. In one implementation, ribs extend (generally) longitudinally along a length of sleeve 300. As such, in examples, ribs 340 provide reinforcement to sleeve 300.

FIGS. 30 and 31 illustrate examples of use of sleeve 300. As illustrated in the example of FIG. 30, sleeve 300 may be used to store a multi-tool, such as, for example, bit driver multi-tool 100 (see, for example, FIG. 1). As illustrated in the example of FIG. 31, sleeve 300 may be used to store a multi-tool, such as, for example, chain break and tire plug multi-tool 200 (see, for example, FIG. 15).

Bar End Cap (400)

FIGS. 32 and 33 are perspective views of an example of a bar end cap.

FIG. 34 is an elevation view of the bar end cap of FIG. 32.

FIG. 35 is a cross-sectional view of the bar end cap of FIG. 34.

FIGS. 36 and 37 illustrate an example of use of the bar end cap of FIG. 32.

FIGS. 38 and 39 illustrate examples of use of the bar end cap of FIG. 32.

In one example, bar end plug or bar end cap 400 (referred to hereinafter as end cap 400) includes a cylindrical body 410 and has a capped end 420 and an open end 440 opposite capped end 420. In the illustrated example, capped end 420 includes a peripheral surface 422, an outer or end face 424, and an inner face 426. In one example, capped end 420 includes a tapered surface 428 extended at a non-orthogonal angle between end face 424 and peripheral surface 422. In one implementation, tapered surface 428 extends less than a full circumference of capped end 420.

In one example, capped end 420 includes a notch or pocket 430 formed in and communicated with inner face 426 and peripheral surface 422. In one implementation, notch or pocket 430 is formed in a region of capped end 420 which excludes (i.e., does not include) tapered surface 428. As such, in one example, as illustrated in FIG. 34, a minimum width or thickness (t) of peripheral surface 422 is provided in a region of tapered surface 428 and a region of notch or pocket 430.

In one implementation, body 410 includes an annular ring or barb 412 at (adjacent or near) open end 440. In examples, barb 412 provides friction-fit of end cap 400 within a sleeve, as disclosed herein. In one implementation, body includes a shoulder 414 to limit insertion of end cap 400 into a sleeve, as disclosed herein.

In one example, a groove 444 is provided in an inner surface 442 of open end 440. In one implementation, groove 440 is provided in a region of barb 412. In one implementation, as illustrated in the example of FIG. 35, an O-ring 450 is provided within groove 440. As such, in examples, O-ring 450 helps to retain an item positioned within open end 440, as disclosed herein.

FIGS. 36 and 37 illustrate an example of use of end cap 400. For example, end cap 400 may be used to seal or cap an end of a hollow bar. More specifically, end cap 400 may be inserted into an open end 492 of a hollow bar 490 such that a shoulder 427 of capped end 420, as formed by inner face 426, abuts or contacts an end surface 494 of hollow bar 490. In one implementation, an outer periphery 416 of body 410 provides friction-fit of end cap 400 within an end of hollow bar 490, and shoulder 427 of capped end 420 limits insertion of end cap 400 into open end 492 of hollow bar 490. In examples, hollow bar 490 is a handlebar for a bicycle.

FIGS. 38 and 39 illustrate examples of use of end cap 400. As illustrated in the example of FIG. 38, end cap 400 may be used to store a chain link 498 for a roller chain, such as a master link for a roller chain of a bicycle. More specifically, chain link 498 may be inserted into open end 440 of end cap 400. As such, in examples, O-ring 450 (FIG. 35) may help to hold or retain chain link 498 within open end 440. As illustrated in the example of FIG. 39, end cap 400 may be used to store a valve core 499 for a valve stem of an inner tube or a wheel rim, such as an inner tube or a wheel rim of a bicycle. More specifically, valve core 499 may be inserted into open end 440 of end cap 400. As such, in examples, O-ring 450 (FIG. 35) may help to hold or retain valve core 499 within open end 440. Although illustrated and described as being used to store a chain link or a valve core, end cap 400 may also be used to store other items, such as, for example, a Presta-to-Schrader valve adapter.

Multi-Tool Storage Sleeve Assembly (500)

FIG. 40 is a perspective view of an example of a multi-tool sleeve assembly.

FIG. 41 is an elevation view of the multi-tool sleeve assembly of FIG. 40.

FIG. 42 is a cross-sectional view of a portion of the multi-tool sleeve assembly of FIG. 41.

FIG. 43 illustrates an example of use of the multi-tool sleeve assembly of FIG. 40.

FIG. 44 schematically illustrates another example of use of the multi-tool sleeve assembly of FIG. 40.

FIG. 45 is an elevation view of the multi-tool sleeve assembly of FIG. 40.

In one implementation, as illustrated in the example of FIGS. 40 and 41, multi-tool storage sleeve 300 (for example, FIG. 26) and bar end cap 400 (for example, FIG. 32) are assembled to form multi-tool storage sleeve assembly 500 (referred to hereinafter as sleeve assembly 500). More specifically, as illustrated in the example of FIG. 42, open end 440 of end cap 400 is inserted into open end 312 of sleeve 300. As such, barb 412 of end cap 400 contacts an inner surface of sleeve 300 and an end of sleeve 300 abuts or contacts shoulder 414 of end cap 400.

FIG. 43 illustrates an example of use of sleeve assembly 500. For example, sleeve assembly 500 is inserted into an open end 592 of a hollow bar 590. As such, in one example, barbs 330 of sleeve 300 contact an inner surface of hollow bar 590 and shoulder 427 of capped end 420 of end cap 400 abuts or contacts an end surface 594 of hollow bar 590. In examples, hollow bar 590 is a handlebar for a bicycle.

Although hollow bar 590 is illustrated as being a straight bar, in other examples, hollow bar 590 may be of other shapes, including, for example, a curved bar. For example, FIG. 44 schematically illustrates an example of sleeve assembly 500 inserted into a curved hollow bar 590'. As such, in some examples, hollow bar 590 may be a straight portion of a "flat" or "riser" handlebar for a bicycle and, in other examples, hollow bar 590 may be a curved portion of a "drop" handlebar for a bicycle.

In one example, as illustrated in the example of FIG. 45, flap 320 of sleeve 300 may be trimmed to adjust a fit of sleeve 300 within, for example, hollow bar 590 and/or hollow bar 590'. More specifically, flap 320 may be trimmed (as represented, for example, by dashed line 329) to adjust an amount of overlap of flap 320 relative to tubular member 310.

Multi-Tool System (600)

FIGS. 46A and 46B are perspective views of an example of a multi-tool system in unassembled and assembled states, respectively.

FIGS. 47A and 47B are perspective views of another example of a multi-tool system in unassembled and assembled states, respectively, and FIG. 47C is a partial cross-sectional view of the multi-tool system of FIG. 47B.

FIGS. 48A, 48B, and 48C illustrate an example of storing the multi-tool system of FIG. 46B or FIG. 47B.

FIG. 49 illustrates an example of storing the multi-tool system of FIG. 46B or FIG. 47B.

As an example of multi-tool system 600, multi-tool system 601 includes bit driver multi-tool 100 and multi-tool storage sleeve assembly 500 for storing bit driver multi-tool 100. In an unassembled (or unstored or unstowed) state, as illustrated in the example of FIG. 46A, bit driver multi-tool 100 is removed from multi-tool storage sleeve assembly 500 including, more specifically, removed from pocket or chamber 322 of sleeve 300 through opening 318. As such, bit driver multi-tool 100 may be used. In one example, a valve core for a valve stem of an inner tube or a wheel rim, such as valve core 499, may also be stored in multi-tool storage sleeve assembly 500, including, more specifically, in an end of bar end cap 400, such as open end 440 (see, for example, FIG. 39).

In an assembled (or stored or stowed) state, as illustrated in the example of FIG. 46B, bit driver multi-tool 100 (with or without valve core 499) is positioned within multi-tool storage sleeve assembly 500 including, more specifically, positioned within pocket or chamber 322 of sleeve 300 through opening 318 (FIG. 46A). As such, multi-tool storage sleeve assembly 500, with bit driver multi-tool 100 stored therein (with or without valve core 499), may be stored, as disclosed herein.

As another example of multi-tool system 600, multi-tool system 602 includes chain break and tire plug multi-tool 200 and multi-tool storage sleeve assembly 500 for storing chain break and tire plug multi-tool 200. In an unassembled (or unstored or unstowed) state, as illustrated in the example of FIG. 47A, chain break and tire plug multi-tool 200 is removed from multi-tool storage sleeve assembly 500 including, more specifically, removed from pocket or chamber 322 of sleeve 300 through opening 318. As such, chain break and tire plug multi-tool 200 may be used. In one example, a chain link for a roller chain, such as chain link 498, may also be stored in multi-tool storage sleeve assembly 500, including, more specifically, in an open end of bar end cap 400, such as open end 440 (see, for example, FIG. 38).

In an assembled (or stored or stowed) state, as illustrated in the example of FIG. 47B, chain break and tire plug multi-tool 200 (with or without chain link 498) is positioned within multi-tool storage sleeve assembly 500 including, more specifically, positioned within pocket or chamber 322 of sleeve 300 through opening 318 (FIG. 47A). In one example, as illustrated in FIG. 47C, chain link 498 may be stored in open end 440 of bar end cap 400 (see also, for example, FIG. 38). As such, multi-tool storage sleeve assembly 500, with chain break and tire plug multi-tool 200 stored therein (with or without chain link 498), may be stored, as disclosed herein.

FIGS. 48A, 48B, and 48C illustrate an example of storing multi-tool system 600. For example, multi-tool system 601 or multi-tool system 602 may be stored in a hollow bar, such as, for example, a handlebar 690 of a bicycle. More specifically, multi-tool sleeve assembly 500 (with, for example, bit driver multi-tool 100 or chain break and tire plug multi-tool 200 stored therein) is inserted into an open end 692 of handlebar 690 such that sleeve 300 is positioned within handlebar 690 and end cap 400 seals or caps open end 692 of handlebar 690.

In one implementation, as illustrated in FIG. 49, multi-tool system 601 or multi-tool system 602 is stored in handlebar 690 such that tapered surface 428 of bar end cap 400 is oriented in a forward direction (i.e., a direction of travel of the bicycle) and notch or pocket 430 is oriented in an opposite direction. As such, tapered surface 428 may help to deflect handlebar 690 if an end of handlebar 690 makes contact with an object (for example, a tree).

In addition, as illustrated in the example of FIG. 49, with multi-tool system 601 or multi-tool system 602 positioned within handlebar 690, notch or pocket 430 may facilitate removal of multi-tool system 601 or multi-tool system 602 from handlebar 690. For example, a user may place a thumb or finger nail, or a flat blade tool, in notch or pocket 430 to pry or force bar end cap 400 (and, therefore, multi-tool system 601 or multi-tool system 602) out of handlebar 690.

Spoke Wrench and Valve Core Multi-Tool (700)

FIGS. 50 and 51 are perspective views of an example of a spoke wrench and valve core multi-tool.

FIG. 52 is an elevation view of the spoke wrench and valve core multi-tool of FIG. 50.

FIGS. 53, 54, 55, and 56 illustrate examples of use of the spoke wrench and valve core multi-tool of FIG. 50.

In one example, spoke wrench and valve core multi-tool 700 (referred to hereinafter as multi-tool 700) includes a body 710, a head 720, and a shank 730. In the illustrated example, head 720 extends from one end of body 710, and shank 730 extends from an opposite end of body 710.

In one implementation, body 710 has a medial axis 711 and shank 730 has a longitudinal axis 731. In one implementation, longitudinal axis 731 of shank 730 is offset from medial axis 711 of body 710. In addition, in one implementation, a midline 721 of head 720 is coaxial or aligned with medial axis 711 of body 710. As such, multi tool 700 is asymmetrical about a plane extending along medial axis 711 of body 710 through a center of head 720.

In one example, body 710 has an opening 712 formed therethrough such that multi-tool 700 may be used as a wrench. In one implementation, as disclosed herein, opening 712 is sized and shaped such that multi-tool 700 may be used as a tool for loosening and/or tightening or removing and/or installing a valve core of a valve stem of an inner tube or a wheel rim, such as an inner tube or a wheel rim of a bicycle. In one implementation, opening 712 is an enclosed opening.

In one implementation, head 720 has an open end 722 with parallel sides or tines 724 that form "jaws". As such, multi-tool 700 may be used as an open-end wrench. In one implementation, as disclosed herein, open end 722 is sized and shaped such that multi-tool 700 may be used as a tool for loosening and/or tightening a spoke (or a nipple of a spoke) of a wheel rim, such as a wheel rim of a bicycle.

In examples, for use of multi-tool 700, shank 730 may be gripped by a user and/or driven by a bit driver, such as, for example, bit driver multi-tool 100 (see, for example, FIG. 1). As such, in one implementation, shank 730 is shaped for insertion into a head of a bit driver, such as, for example, head 120 of bit driver multi-tool 100 (see, for example, FIG. 1).

Figure 53:
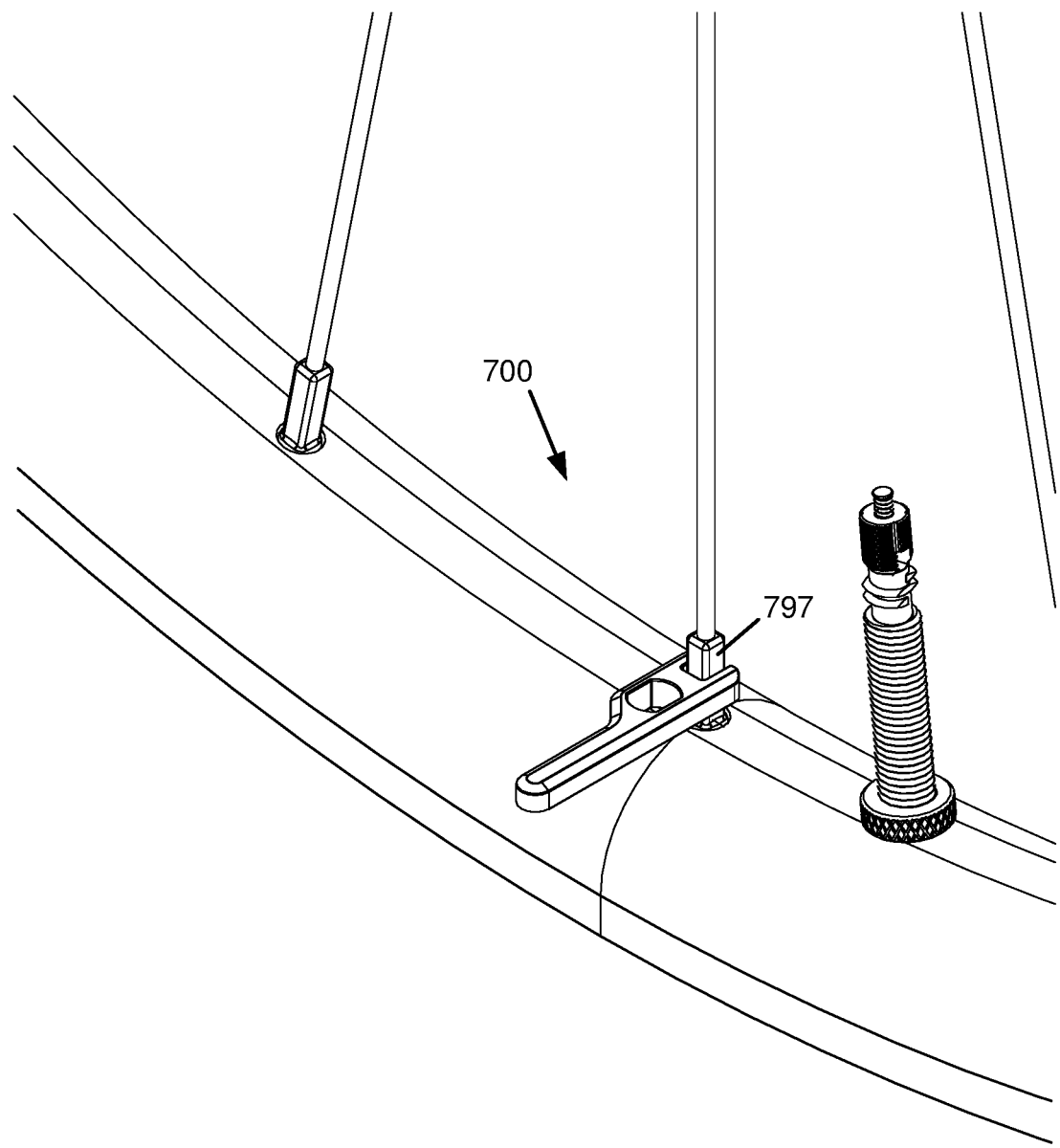
Figure 54:
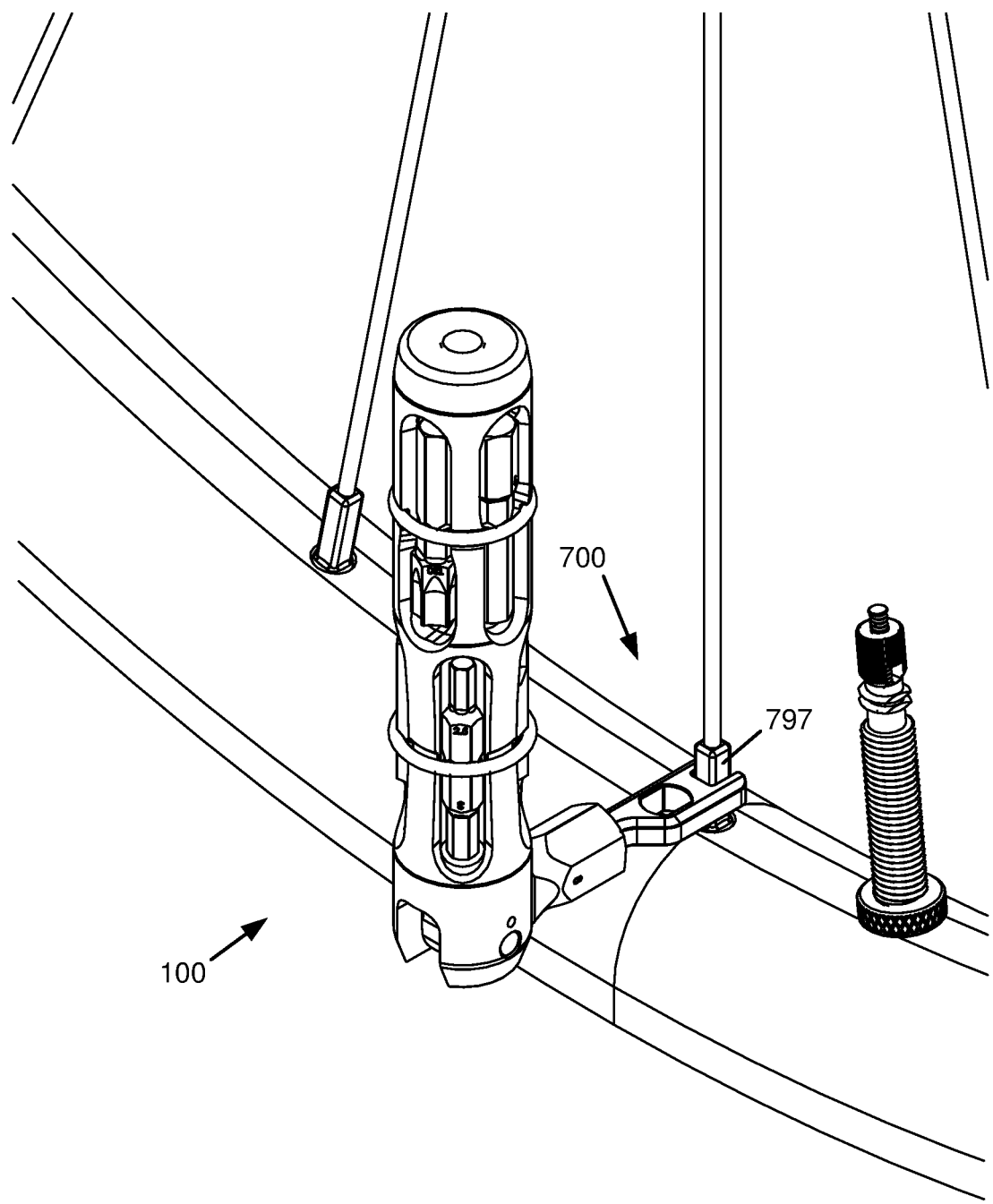

FIGS. 53 and 54 illustrate an example of use of multi-tool 700. For example, multi-tool 700 may be used as a spoke wrench. More specifically, head 720 may be used as a spoke wrench. As such, open end 722 is configured to engage a spoke or a spoke nipple of a wheel rim, such as, for example, a spoke nipple 797 of a wheel rim of a bicycle. Thus, with head 720, spoke nipple 797 may be loosened and/or tightened and/or removed and/or installed. As illustrated in the example of FIG. 54, multi-tool 700 may be operated or driven by a bit driver, such as, for example, bit driver multi-tool 100.

Figure 55:
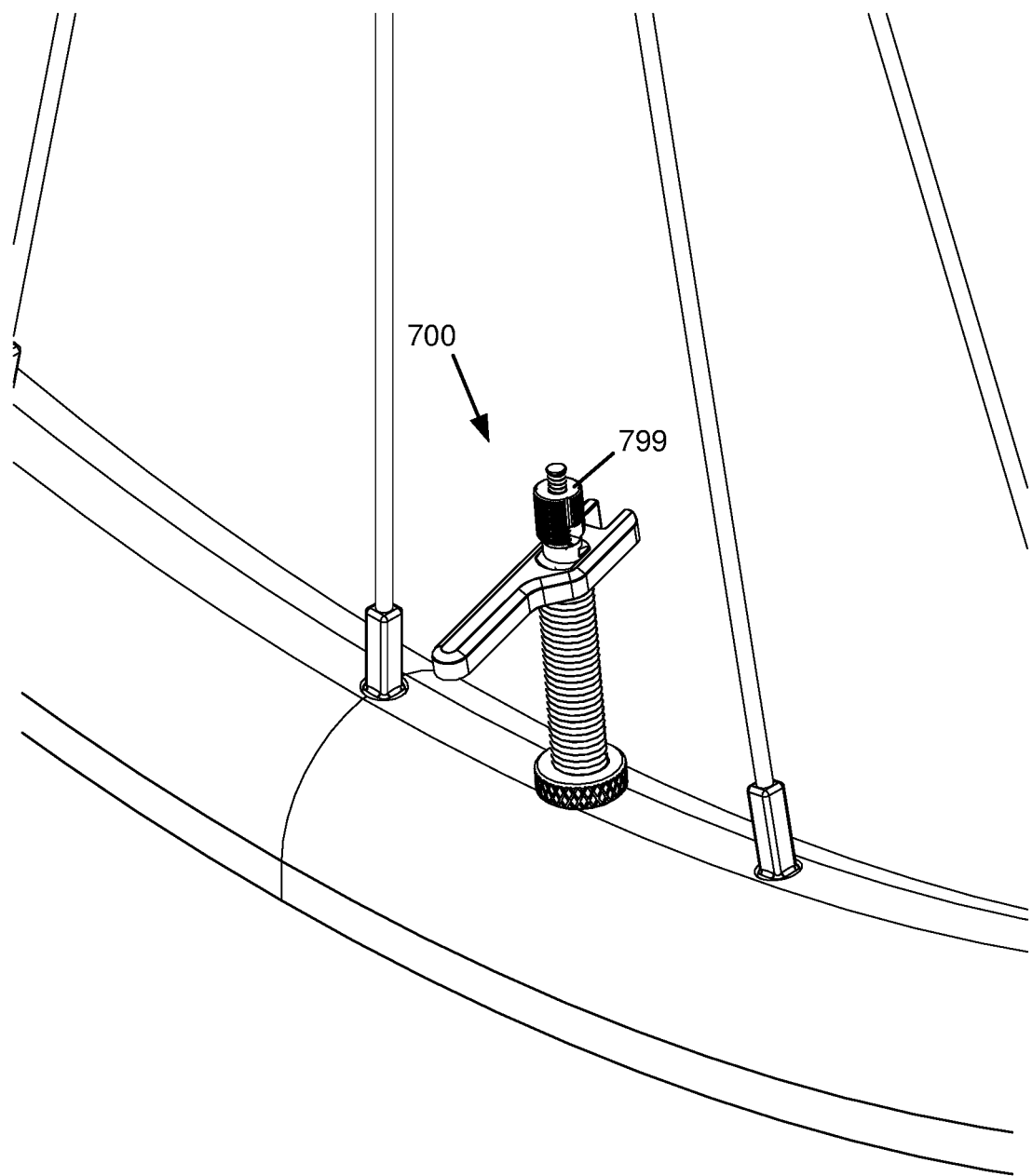
Figure 56:
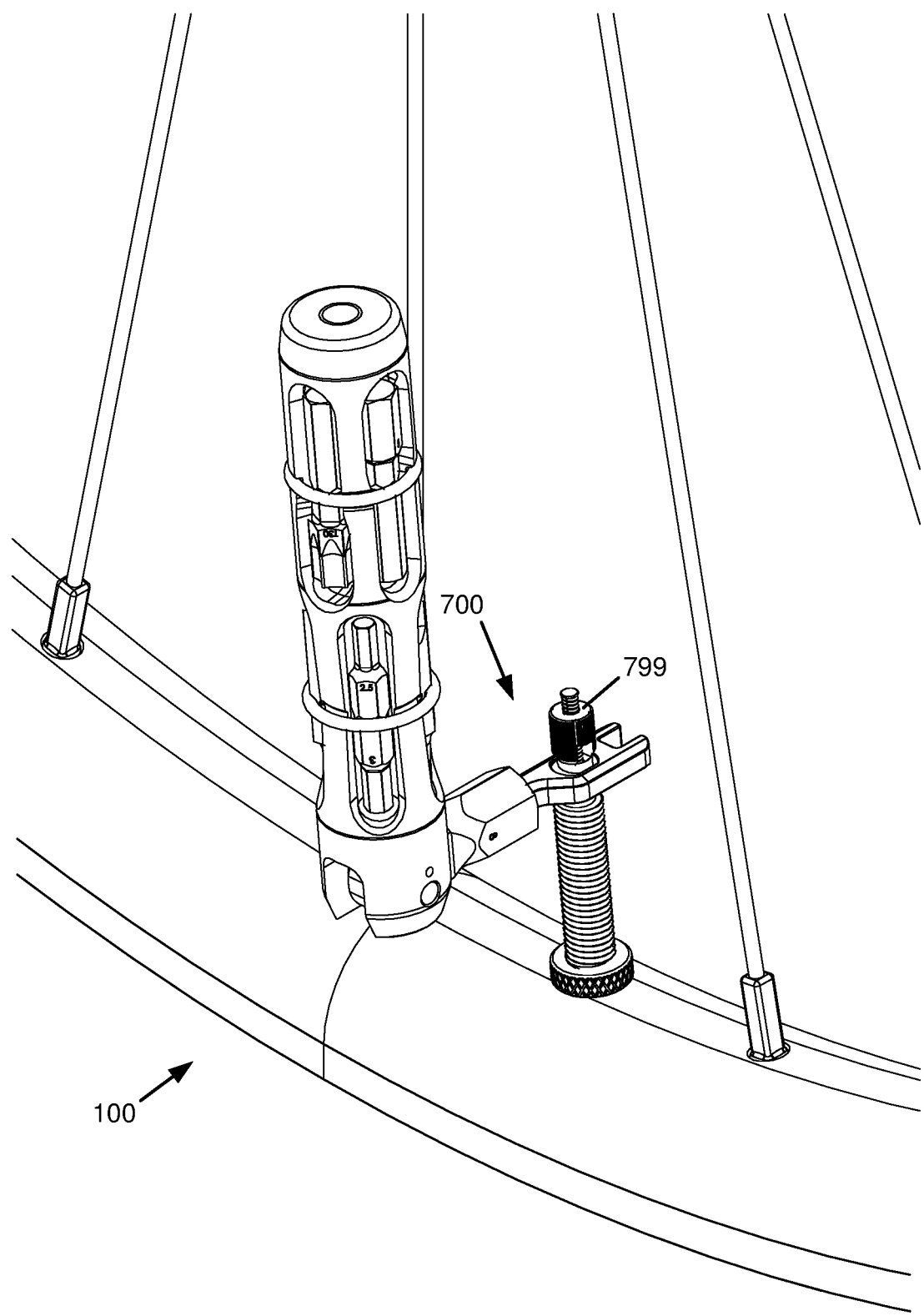

FIGS. 55 and 56 illustrate an example of use of multi-tool 700. For example, multi-tool 700 may be used as a valve core tool. More specifically, opening 712 in body 710 may be used as a valve core tool. As such, opening 712 is configured to engage a valve core of a valve stem of an inner tube or a wheel rim, such as, for example, a valve core 799 of a valve stem an inner tube or a wheel rim of a bicycle. Thus, with opening 712 in body 710, valve core 799 may be loosened and/or tightened and/or removed and/or installed. As illustrated in the example of FIG. 56, multi-tool 700 may be operated or driven by a bit driver, such as, for example, bit driver multi-tool 100.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples disclosed herein.

What is claimed is:

1. A multi-tool system, comprising:
a multi-tool sleeve assembly comprising:
a storage sleeve, and
an end cap to be inserted into an open end of the storage sleeve; and
a bit driver multi-tool to be stored in the storage sleeve of the multi-tool sleeve assembly,
the storage sleeve of the multi-tool sleeve assembly having an opening formed in a side thereof and including a flap to be opened and closed to substantially reveal and substantially conceal the opening, and
the bit driver multi-tool to be removed from or positioned within the storage sleeve through the opening.

2. The multi-tool system of claim 1, further comprising: one of a chain link for a roller chain or a valve core for a valve stem to be stored in an open end of the end cap.

3. The multi-tool system of claim 1, the multi-tool sleeve assembly to be inserted into an open end of a hollow bar.

4. The multi-tool system of claim 3, the storage sleeve to be positioned within the hollow bar.

5. The multi-tool system of claim 3, the end cap to seal the open end of the hollow bar.

6. The multi-tool system of claim 3, the hollow bar comprising a handlebar for a bicycle.

7. The multi-tool system of claim 1, the bit driver multi-tool comprising:
a cylindrical body, and
a head extended from an end of the cylindrical body,
the head including a socket to receive an insert bit,
the head to be pivoted between a first position with the head aligned with the cylindrical body and a second position with the head oriented at an angle to the cylindrical body.

8. The multi-tool system of claim 7, the cylindrical body of the bit driver multi-tool including a cavity to store the insert bit.

9. The multi-tool system of claim 1, the flap of the storage sleeve hinged with the storage sleeve along an axis oriented substantially parallel with a longitudinal axis of the storage sleeve.

10. A multi-tool system, comprising:
a storage sleeve;
an end cap at an end of the storage sleeve; and
a bit driver multi-tool to be stored in the storage sleeve,
the storage sleeve, with the bit driver multi-tool stored therein, to be inserted into an open end of a hollow bar,
the storage sleeve having an opening formed in a side thereof and including a flap to be opened and closed to substantially reveal and substantially conceal the opening, and
the bit driver multi-tool to be removed from or positioned within the storage sleeve through the opening.

11. The multi-tool system of claim 10, the end cap to cap the open end of the hollow bar.

12. The multi-tool system of claim 10, the hollow bar comprising a handlebar for a bicycle.

* * * * *